US008760779B2

(12) United States Patent  
Johns et al.

(10) Patent No.: US 8,760,779 B2  
(45) Date of Patent: Jun. 24, 2014

(54) ENERGY-ASSISTED MAGNETIC RECORDING HEAD AND SYSTEMS THEREOF WITH ENVIRONMENTAL CONDITIONS CONTROL

(75) Inventors: William D. Johns, Tokyo (JP); David L. Whitaker, Laguna Beach, CA (US); Ikuya Tagawa, Hiratsuka (JP); Yoshihiro Shiroishi, Tokyo (JP)

(73) Assignee: HGST Netherlands B.V., Amsterdam (NL)

( * ) Notice: Subject to any disclaimer, the term of this patent is extended or adjusted under 35 U.S.C. 154(b) by 194 days.

(21) Appl. No.: 13/341,098

(22) Filed: Dec. 30, 2011

(65) Prior Publication Data

US 2013/0170060 A1   Jul. 4, 2013

(51) Int. Cl.  
G11B 5/02 (2006.01)  
G11B 27/36 (2006.01)

(52) U.S. Cl.  
USPC ............................................. 360/31; 360/59

(58) Field of Classification Search  
None  
See application file for complete search history.

(56) References Cited

U.S. PATENT DOCUMENTS

| | | | |
|---|---|---|---|
| 5,408,365 A | 4/1995 | Van Doorn et al. | |
| 6,163,425 A | 12/2000 | Isokawa et al. | |
| 6,262,858 B1 | 7/2001 | Sugiyama | |
| 6,608,728 B1 | 8/2003 | Sugiyama | |
| 6,671,232 B1 | 12/2003 | Stupp | |
| 6,958,929 B2 | 10/2005 | Abraham et al. | |
| 7,660,059 B2 | 2/2010 | Ahn et al. | |
| 2003/0058559 A1 | 3/2003 | Brand et al. | |
| 2007/0273993 A1* | 11/2007 | Noda et al. ........................ 360/31 |
| 2009/0303629 A1 | 12/2009 | Nakano et al. | |
| 2009/0310244 A1 | 12/2009 | Shimazawa et al. | |
| 2010/0110592 A1 | 5/2010 | Koui et al. | |
| 2010/0208387 A1* | 8/2010 | Ehrlich ........................ 360/97.02 |
| 2010/0232053 A1 | 9/2010 | Yano et al. | |
| 2011/0128648 A1 | 6/2011 | Ezawa et al. | |
| 2011/0216435 A1 | 9/2011 | Shiimoto et al. | |
| 2012/0092972 A1* | 4/2012 | Taratorin et al. ........... 369/13.29 |

FOREIGN PATENT DOCUMENTS

JP         11039839 A       2/1999

OTHER PUBLICATIONS

Zhu et al., "Microwave Assisted Magnetic Recording," 2007 IEEE, IEEE Transactions on Magnetics, vol. 44, No. 1, Jan. 2008, pp. 125-131.

* cited by examiner

Primary Examiner — Regina N Holder  
(74) Attorney, Agent, or Firm — Zilka-Kotab, PC

(57) ABSTRACT

In one embodiment, a system includes a medium, a magnetic head having a write element adapted for writing data to the medium, a MAMR element and/or a TAMR element adapted for assisting recording on the medium, the MAMR element having a microwave-generating portion that receives current for operation thereof, the TAMR element having a localized heat-generating portion that receives current for operation thereof, and a read element adapted for reading data from the medium, a device adapted for measuring environmental conditions relating to the TAMR/MAMR elements and the medium, and a controller adapted for controlling operation of the magnetic head and adjusting operating parameters of the system based on the environmental conditions. The environmental conditions include temperature, a reproduced signal of the read element, and/or clearance between the TAMR/MAMR elements and the medium. The operating parameters include the clearance, amount of current injected to the TAMR/MAMR elements, and/or write current.

19 Claims, 21 Drawing Sheets

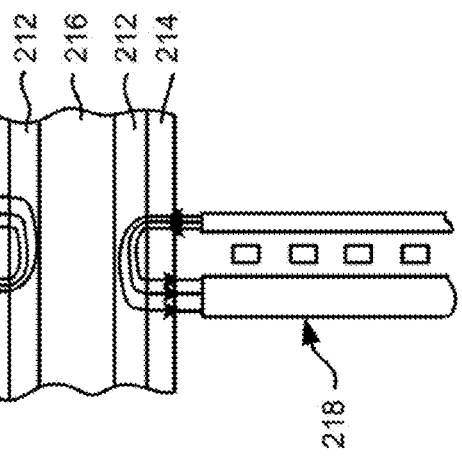
FIG. 2E
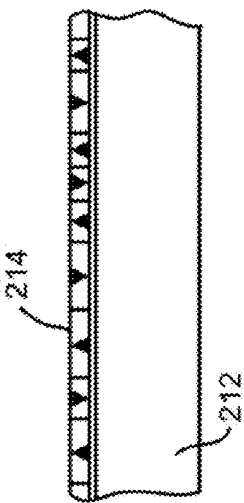
FIG. 2C
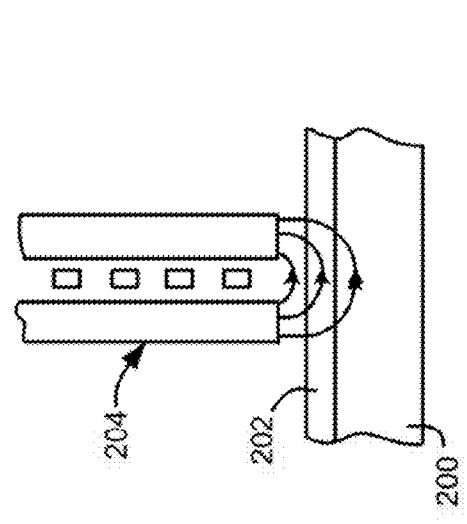
FIG. 2D
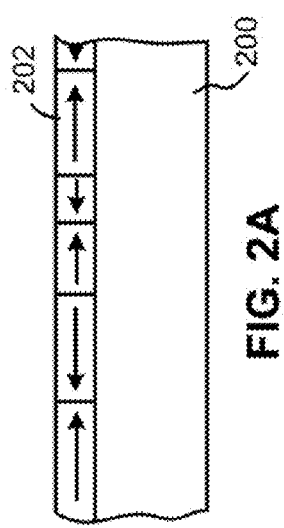
FIG. 2A
FIG. 2B

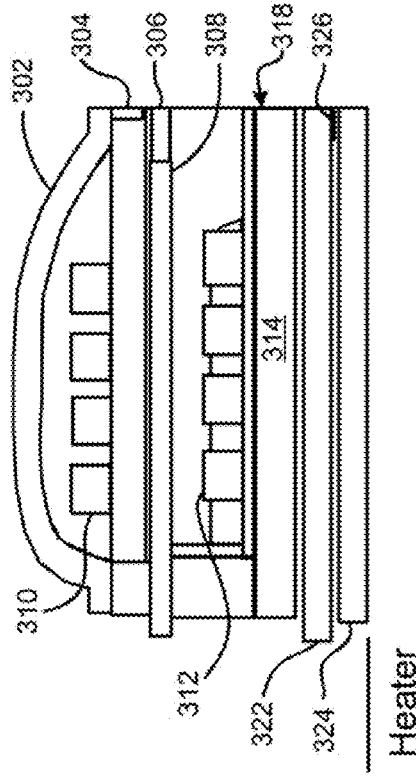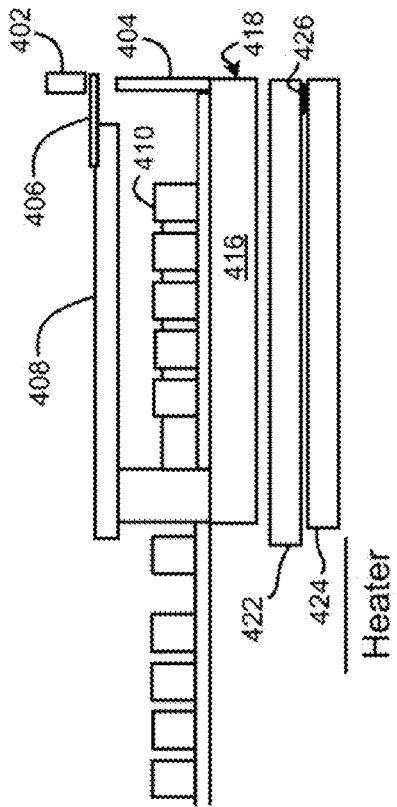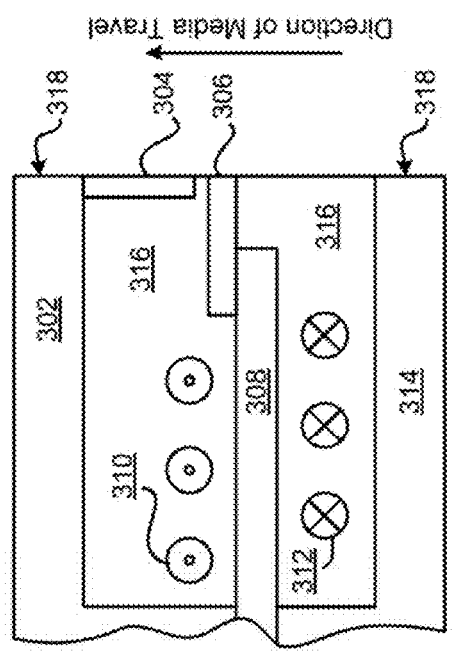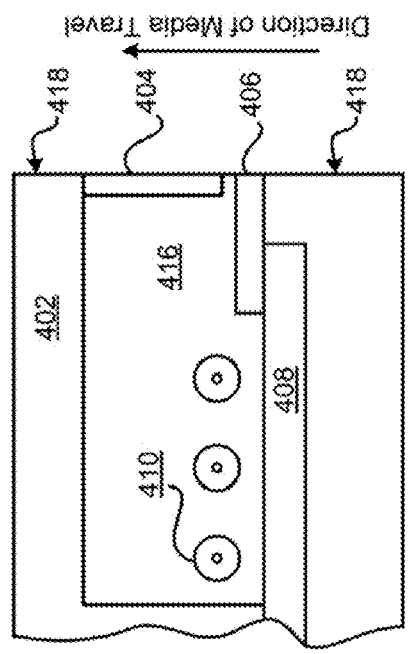

ENERGY-ASSISTED MAGNETIC RECORDING HEAD AND SYSTEMS THEREOF WITH ENVIRONMENTAL CONDITIONS CONTROL

FIELD OF THE INVENTION

The present application relates to energy-assisted magnetic recording, and particularly to magnetic heads and magnetic devices implementing energy-assisted magnetic recording with environmental conditions control.

BACKGROUND

Conventional magnetic recording and reading devices, such as hard disk drives, optical drives, etc., are optimized for many parameters to run at various temperatures and operating conditions. The allowable temperatures and conditions may be visualized as windows of operation where the conditions and temperatures allow for consistently superior performance. These windows of operation have been getting smaller and smaller due to difficulties associated with areal density, such as a super-paramagnetic limit, size constraints, tolerances, process control limitations, etc. Operation of magnetic devices at cold temperatures, as an example, often requires additional write-ability of a magnetic recording head, and at higher temperatures is capable of writing in a manner which limits the thermal instability of a magnetic recording medium. In addition, surplus write current which is used for higher write-ability usually induces large thermal protrusion of write poles, which is equivalent to lower thermal fly-height control (TFC) power, which often results in poor head-disk interface (HDI) reliability, even at low temperatures.

Some attempts have been made at correcting for these issues. In one scheme to improve the write-ability of a magnetic recording head, a localized AC field is applied at adequate frequency to the medium using a spin torque oscillator (STO). This scheme is referred to as microwave-assisted magnetic recording (MAMR). However, it is very difficult to generate a localized AC field at microwave frequencies in a stable and reliable enough manner to assist high density magnetic recording in a thermally stable medium using a STO. Because an injected current density necessary to generate an appropriate AC field at microwave frequencies to assist high density magnetic recording is too high, such as $10^8$-$10^9$ A/cm$^2$, stable and reliable operation is often prevented using this scheme due to electro-migration.

Another attempt at correcting these issues relies on applying localized heat to or above the Curie temperature of the magnetic material of the media, such as higher than 300° C., within a nanosecond using a near field element and a laser, or just a laser. This scheme is referred to as thermally-assisted magnetic recording (TAM). However, such high temperatures are required for high density magnetic recording, but in these high temperatures the lubricant typically used to coat the medium may desorb from the surface of the medium, decompose, and possibly degrade. Furthermore, the diamond-like carbon (DLC) overcoat may degrade, inducing degradation of HDI related performance, such as head and medium wear, R/W performance, etc. Associated with these high temperatures, other effects, such as thermal protrusion of the write element and/or read element of the magnetic head, as well as transient elastic thermal distortion of the medium surface, have also been found to exacerbate the HDI stability, causing more degradation of HDI related reliability and of the R/W performance of the magnetic recording device.

MAMR and TAMR are referred to as energy assist recording processes, both of which promise improvements in the write-ability of a magnetic recording head.

SUMMARY

The present application relates to energy-assisted magnetic recording, and particularly to magnetic heads and magnetic devices implementing energy-assisted magnetic recording with environmental conditions control.

In one embodiment, a system includes a magnetic medium, a magnetic head having a write element adapted for data recording on the magnetic medium, a microwave-assisted magnetic recording (MAMR) element adapted for assisting recording on the magnetic medium, the MAMR element having a microwave-generating portion that receives current for operation thereof, and a read element adapted for reading data from the magnetic medium, a first device adapted for measuring environmental conditions relating to the MAMR element and the magnetic medium, and a controller adapted for controlling operation of the magnetic head and adjusting operating parameters of the system based on the environmental conditions provided by the first device.

In another embodiment, a system includes a first device adapted for measuring environmental conditions relating to a MAMR element of a magnetic head and a magnetic medium, wherein the MAMR is adapted for assisting recording using a write element of the magnetic head on the magnetic medium, and wherein the MAMR element includes a microwave-generating portion that receives current for operation thereof, and a second device adapted for adjusting operating parameters of the magnetic head based on the environmental conditions provided by the first device.

In yet another embodiment, a method includes using a MAMR element of a magnetic head to generate a localized AC field on a portion of a magnetic medium prior to or while writing data to the portion of the magnetic medium, wherein the MAMR element is provided current for operation thereof, writing data to the portion of the magnetic medium using a write element of the magnetic head, measuring environmental conditions relating to the MAMR element and the magnetic medium, the environmental conditions including at least: temperature, a reproduced signal of the read element, and a clearance between the MAMR element and the magnetic medium, and adjusting operating parameters of the magnetic head based on the measured environmental conditions, the operating parameters including at least: a clearance between the MAMR element and the magnetic medium, and an amount of current injected to the MAMR element, wherein an amount of current provided to the MAMR element at lower operating temperatures is higher than an amount of current provided to the MAMR element at higher operating temperatures.

In more embodiments, a thermally-assisted magnetic recording (TAMR) head and/or a TAMR system may be used in place of or in addition to the MAMR head and/or the MAMR system as described herein.

Any of these embodiments may be implemented in a magnetic data storage system such as a disk drive system, which may include a magnetic head, a drive mechanism for passing a magnetic storage medium (e.g., hard disk) over the head, and a control unit electrically coupled to the head for controlling operation of the head.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

DETAILED DESCRIPTION

Figure 1:
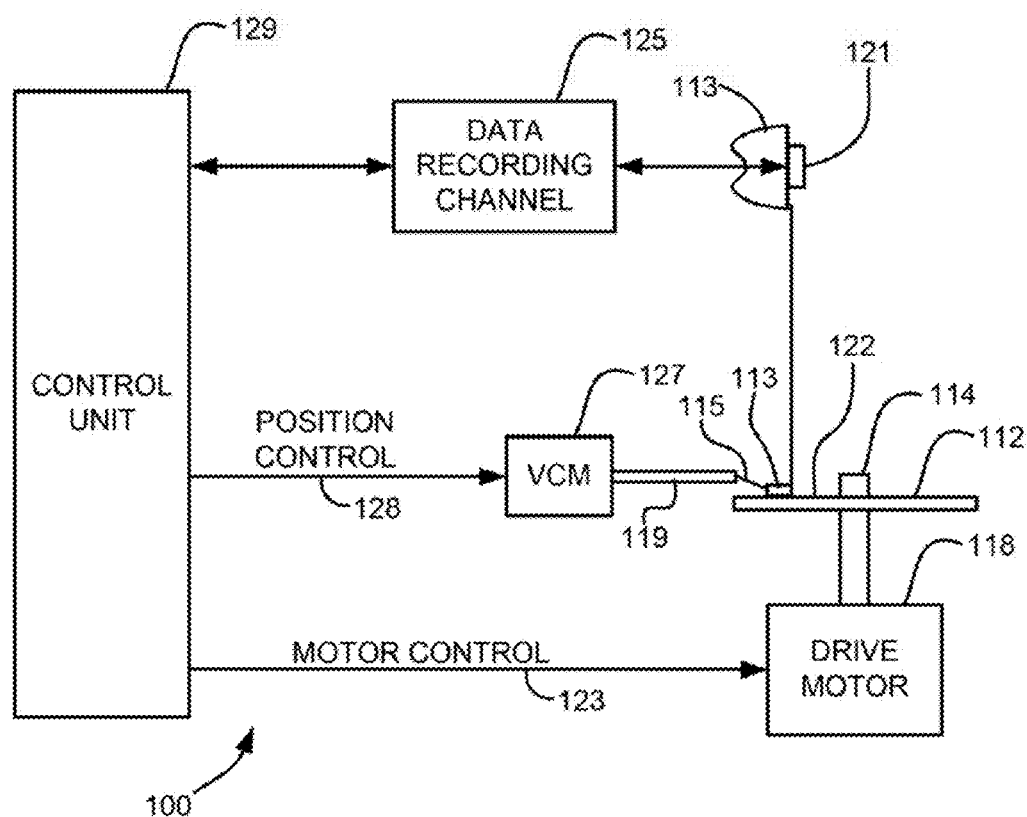
FIG. 1 is a simplified drawing of a magnetic recording disk drive system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one general embodiment, a system includes a magnetic medium, a magnetic head having a write element adapted for data recording on the magnetic medium, a microwave-assisted magnetic recording (MAMR) element adapted for assisting recording on the magnetic medium, the MAMR element having a microwave-generating portion that receives current for operation thereof, and a read element adapted for reading data from the magnetic medium, a first device adapted for measuring environmental conditions relating to the MAMR element and the magnetic medium, and a controller adapted for controlling operation of the magnetic head and adjusting operating parameters of the system based on the environmental conditions provided by the first device.

In another general embodiment, a system includes a first device adapted for measuring environmental conditions relating to a MAMR element of a magnetic head and a magnetic medium, wherein the MAMR is adapted for assisting recording using a write element of the magnetic head on the magnetic medium, and wherein the MAMR element includes a microwave-generating portion that receives current for operation thereof, and a second device adapted for adjusting operating parameters of the magnetic head based on the environmental conditions provided by the first device.

In yet another general embodiment, a method includes using a MAMR element of a magnetic head to generate a localized AC field on a portion of a magnetic medium prior to or while writing data to the portion of the magnetic medium, wherein the MAMR element is provided current for operation thereof, writing data to the portion of the magnetic medium using a write element of the magnetic head, measuring environmental conditions relating to the MAMR element and the magnetic medium, the environmental conditions including at least: temperature, a reproduced signal of the read element, and a clearance between the MAMR element and the magnetic medium, and adjusting operating parameters of the magnetic head based on the measured environmental conditions, the operating parameters including at least: a clearance between the MAMR element and the magnetic medium, and an amount of current injected to the MAMR element, wherein an amount of current provided to the MAMR element at lower operating temperatures is higher than an amount of current provided to the MAMR element at higher operating temperatures.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112. The data tracks may be a series of distinct and separated tracks, a series of overlapping tracks with each track sharing a portion of the disk 112 with another track (shingled recording tracks), or any other type of data track and/or track pattern as would be known to one of skill in the art.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

According to one illustrative embodiment, a magnetic data storage system may comprise at least one magnetic head as described herein according to any embodiment, a magnetic medium, a drive mechanism for passing the magnetic medium over the at least one magnetic head, and a controller electrically coupled to the at least one magnetic head for controlling operation of the at least one magnetic head.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the write pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, write pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the write pole 306 and then to the surface of the disk positioned towards the ABS 318.

FIG. 3B illustrates a piggyback magnetic head having similar features to the head of FIG. 3A. Two shields 304, 314 flank the stitch pole 308 and write pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the write pole 406. In this orientation, the lower return pole is optional. Insulation 416 surrounds the coils 410, and may provide support for the stitch pole 408 and write pole 406. The stitch pole may be recessed from the ABS 418. The direction of the media travel, as indicated by the arrow to the right of the structure, moves the media past the stitch pole 408, write pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the write pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater element (Heater) may also be included in the magnetic heads shown in FIGS. 3A and 4A. The position of this heater may vary based on design parameters such as where the protrusion is desired, coefficients of thermal expansion of the surrounding layers, etc.

Figure 5:
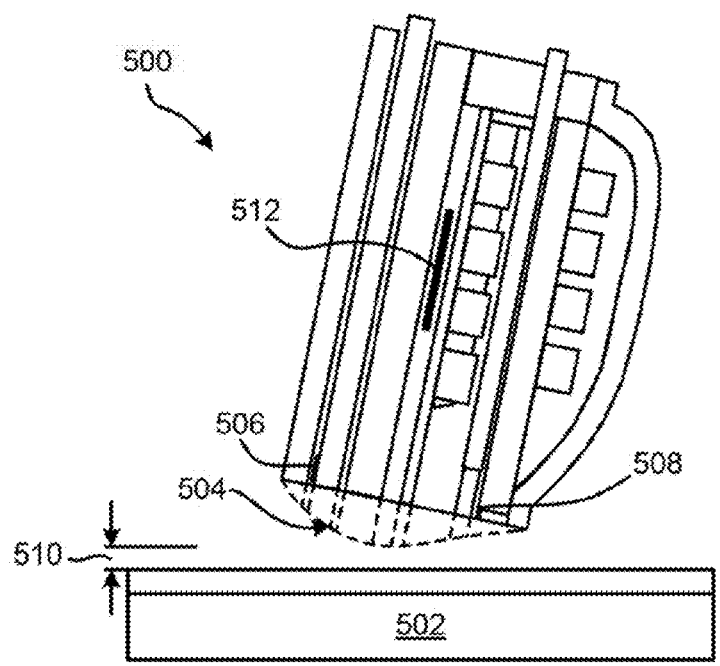
FIG. 5 is a cross-sectional view of a conventional perpendicular magnetic recording (PMR) system, according to the prior art.

Referring to FIG. 5, a conventional perpendicular magnetic recording (PMR) system 500 is shown. In this PMR system 500, a magnetic medium 502 is passed across a head having a read element 506 and a write pole 508 for writing. A thermal fly-height control (TFC) element 512 heats a portion of the head, causing a protrusion 504 which reduces the head-to-disk clearance 510.

Since high temperatures, and particularly surplus localized temperatures that may result from using typical MAMR and/or TAMR systems may cause the lubricant typically used to coat the medium to desorb from the surface of the medium, decompose, and possibly degrade. Furthermore, the diamond-like carbon (DLC) overcoat may degrade, inducing degradation of HDI related performance, such as head and medium wear, R/W performance, etc. Associated with these high temperatures, other effects, such as thermal protrusion of the write element and/or read element of the magnetic head, as well as transient elastic thermal distortion of the medium surface, have also been found to exacerbate the HDI stability, causing more degradation of HDI related reliability and of the R/W performance of the magnetic recording device, as observed using conventional systems.

In one embodiment, surplus localized temperature and write current is prevented, which is beneficial to TAMR implementation, along with preserving a small head-to-medium clearance, especially at high temperatures, while adding additional write-ability of the magnetic recording head using TAMR to increase areal density at cold temperatures.

Figure 6:
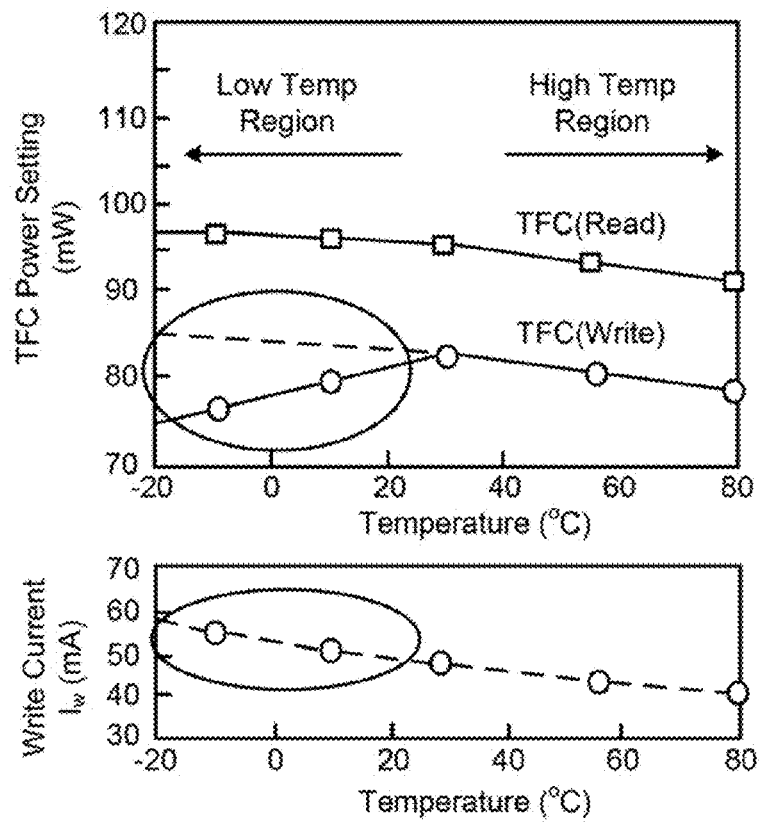
FIG. 6 is a chart showing conventional adjustment for current provided to a thermal fly-height control (TFC) element in a conventional PMR system, according to the prior art.

As shown in FIG. 6, the operating window of the conventional PMR head is quite small. In fact, the window has been getting smaller due to areal density difficulties, and the performance of conventional PMR heads at lower temperatures often utilizes additional write-ability. The surplus write current usually induces large thermal protrusion of the write pole (which is equivalent to a lower TFC power) and typically poor head-disk interface (HDI) related reliability even at low temperatures is achieved.

According to one embodiment, the operating window of a magnetic head utilizing microwave-assisted magnetic recording (MAMR) or thermally-assisted magnetic recording (TAMR) and devices thereof may be widened, allowing for devices to be produced and used with not only large storage capacities, but also high HDI related reliability.

In one method, in a first step, injected current density to a spin torque oscillator (STO) of a magnetic head is adjusted. In one embodiment, the injected current density may be adjusted to account for write-ability and MAMR life time improvement. In a next step, write current to the write element is adjusted. In one embodiment, the write current may be adjusted to account for both write-ability and protrusion control of elements of the magnetic head toward the medium during operation thereof. In another step, thermal fly-height control (TFC) power to at least one TFC element is adjusted. In one embodiment, the TFC power is adjusted to account for clearance control between the STO and a medium.

Any of these steps may be performed in accordance with and/or using information provided by a system to measure environmental conditions in spaces around the magnetic head and the medium, such as magnetic head operating temperature, overwrite (O/W), soft error rate (SER), head-to-disk medium clearance, etc. In another step, the STO current is reduced at higher magnetic head operating temperatures. In one embodiment, the STO current may be reduced by reducing or stopping the use of MAMR.

In accordance with one approach, MAMR may be used exclusively in low temperature operating conditions of the magnetic head to allow the write-ability of the magnetic recording head and medium to be more centered around the harder to write area. The low operating temperature of the magnetic head may be any temperature which would be considered lower than typical in the art of magnetic heads by one of skill in the art, e.g., less than about 30° C., less than about 25° C., less than about 20° C., etc.

In this way, MAMR may be turned off during higher operating temperatures allowing the higher temperature to aid in thermal stability and still be able to write at lower operating temperatures without surplus write current. This enables a remarkable increase in the operating window of the magnetic head, including remarkable MAMR lifetime improvement, allowing the magnetic recording and reading devices to be enhanced with not only large storage capacity but also high HDI related reliability.

STO and MAMR and magnetic devices having MAMR heads are very effective at allowing areal density of a magnetic medium to be increased along with drive storage capacity and improves process capability of the magnetic head by improving write-ability to a high coercive magnetic medium. However, it is often instable due to STO performance degradation, especially at high temperatures. This STO performance degradation was revealed to be caused by electron migration under both extremely high injected current density, such as about $10^8$ A/cm$^2$ to about $10^9$ A/cm$^2$ in STO, and high temperatures. The performance degradation of STO was accelerated to be proportional to $I_d^m * \exp((-U/(k_B T_{STO}))$, where $I_d$ is the current density in STO, m is the constant, U is the activation energy of electro-migration in STO, $k_B$ is the Boltzman constant, and $T_{STO}$ is the absolute temperature of STO. In one approach, m may be about 2 and temperature acceleration factor by the above equation was about 2 times per 10K. If temperature increases by about 50K around room temperature, the degradation rate is accelerated by 30-40 times. The lower the temperature, the much longer the lifetime of the device is capable of achieving. Moreover, the STO assist effect is more effective at lower temperatures, because the recording medium has higher coercivity and becomes more difficult to write as the temperature reduces.

Figure 7:
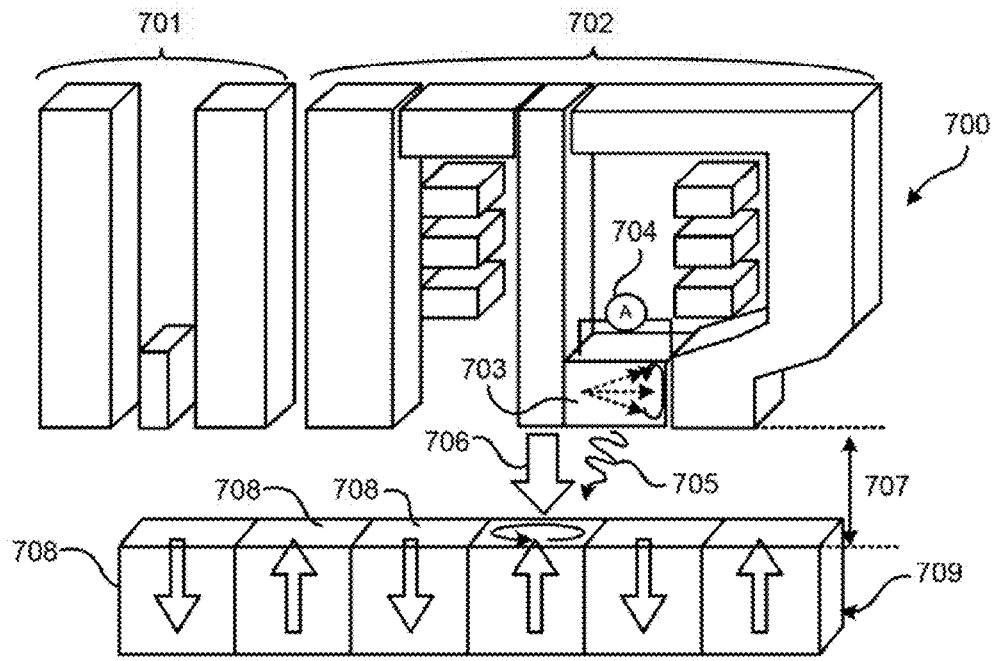
FIG. 7 shows a spin torque oscillator (STO) and a microwave-assisted magnetic recording (MAMR) element in a magnetic head, according to one embodiment.
Figure 8:
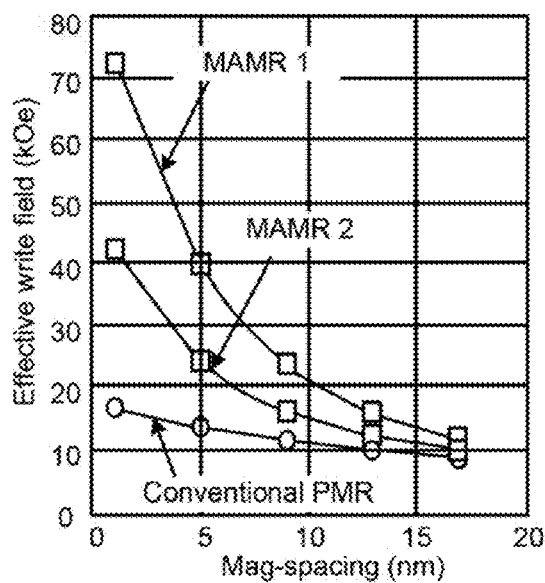
FIG. 8 shows the clearance dependence of the effective write field in MAMR and PMR.

In further research, it was revealed that a MAMR head, such as that shown in FIG. 7 according to one embodiment is remarkably effective, especially for optimization of the operating window of magnetic devices at lower temperatures, as shown in FIG. 6, according to one embodiment. Referring again to FIG. 7, the MAMR head 700 includes a reading portion 701 and a writing portion 702. In the writing portion 702, a STO 703 has current 704 applied thereto, causing a microwave field 705 to be generated. This microwave field 705 assists in the writing 706 of bits 708 on the magnetic medium 709. It was also found that controlling the clearance 707 between STO and the magnetic medium is much more effective at allowing for areal density to be increased over conventional perpendicular magnetic recording (PMR) technology. Using Landau-Lifshitz-Gilbert (LLG) simulation, it was revealed that this may be due to larger clearance dependence of the recording performance of STO, as shown in FIG. 8, according to one embodiment.

Also, in order to reduce large thermal protrusion of write elements (or poles) (equivalent to low TFC power) at low temperatures, which is capable of remarkably improving HDI reliability, more tests were performed. Here, a TFC element controls the head-to-media clearance, as shown in FIG. 7, using a thermal expansion effect of an embedded microheater in the head.

Figure 9:
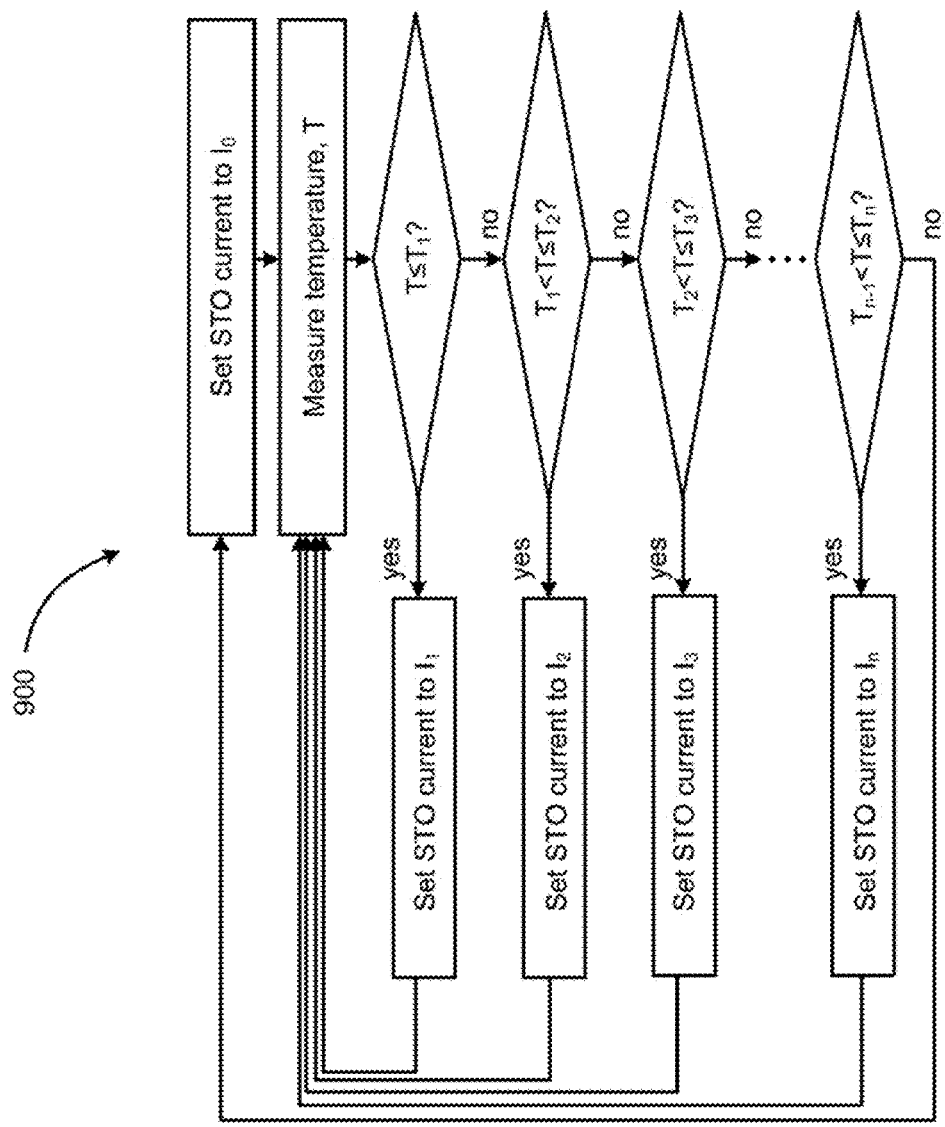
FIG. 9 shows an example of a flowchart for STO setting, according to one embodiment.

A flow chart of a method 900 according to one embodiment is shown in FIG. 9. In method 900, servo signals are written as follows. First, a tentative group of servo signals is written using the given write current, STO current, and TFC power on a special medium region. Then, these parameters are optimized using evaluated data of read and write performances, such as signal output, overwrite (O/W), ATI (Adjacent Track Interference), SER, etc., with the tentative servo signals. Then, the final servo signals are written on the full surfaces of the media using the optimized write current, STO current, and TFC power.

Next, the write current, the STO current, and the TFC power are optimized at temperature regions characterized by carefully selected parameters $T_1, T_2, \ldots,$ and $T_n$ as follows. The read and write performances signal output, overwrite (O/W), ATI, and SER are evaluated on a special medium region in the above defined temperature regions during the manufacturing process. Here, total performance, such as areal density, storage capacity, reliability, etc., may be optimized using the reliability estimation table, etc., for the several sets of the write current, the STO current, and the TFC power.

In addition, the optimized STO current, in each temperature region, $T_{n-1} < T \leq T_n$, is determined for each n. The optimized write current, $I_{w,n}$, and the optimized TFC power, $P_{TFC,n}$ are also determined in the same manner. Here, $I_0$ is an extremely low current value, such as 0, and $T_0=0(K)$, etc.

Figure 10:
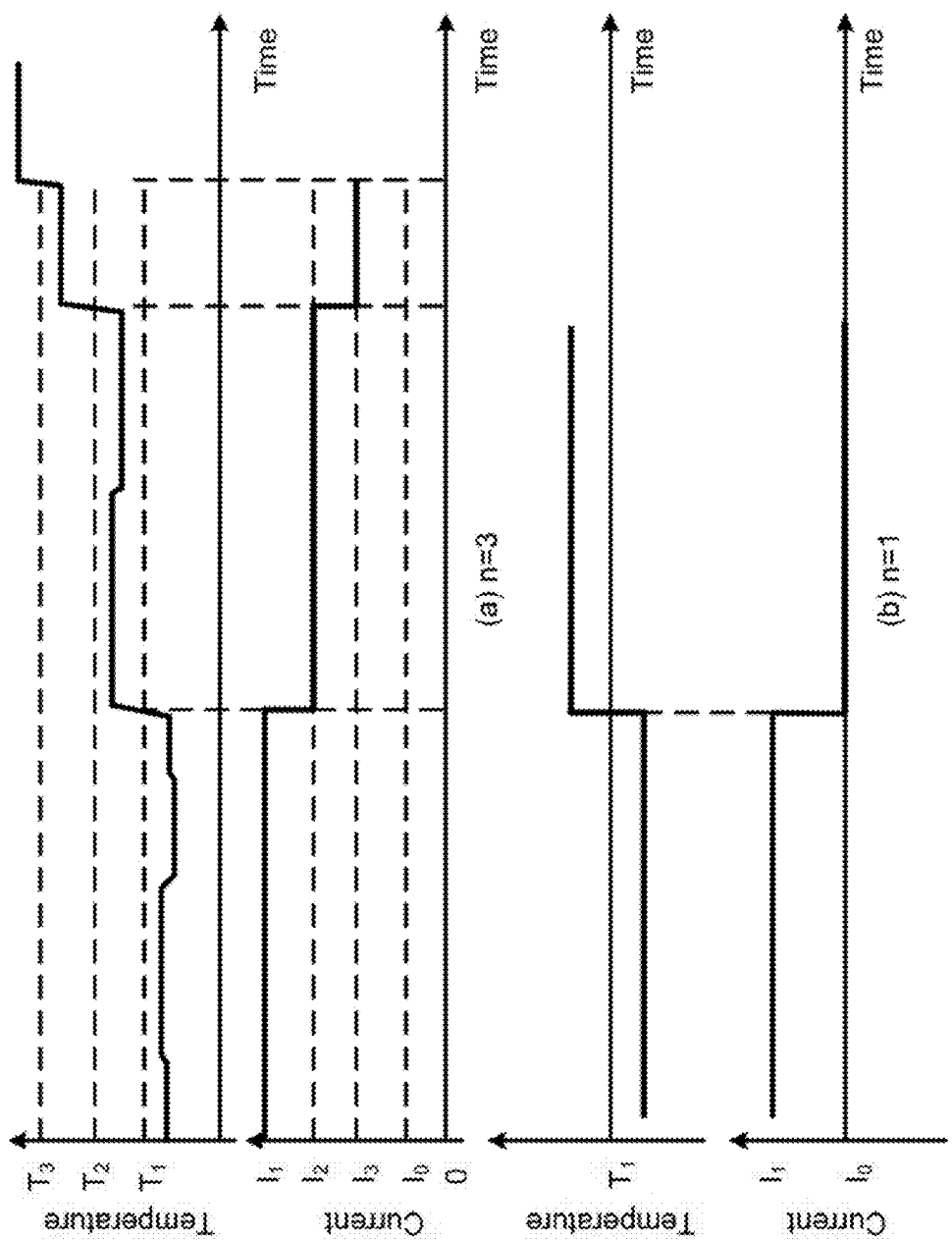
FIG. 10 shows examples of n=3 and n=1 for STO setting, according to one embodiment.

In the field after the shipment of the device, the initial current to STO is set to $I_0$ and then the ambient temperature, T, around the head/media and elements is measured during the recording operation of the magnetic recording device. If T is smaller than or equal to $T_1$ ($T \leq T_1$), STO current is set to $I_1$. And if not, and $T_1 < T \leq T_2$, STO current is set to $I_2$, and if not and $T_2 < T \leq T_3$, STO current is set to $I_3$, etc. This may be summarized as $T_{n-1} < T \leq T_n$, STO current is set to $I_n$, and if not ($T > T_n$), STO current is reset to $I_0$. After setting optimized STO current for the ambient temperature T, recording operations begin. Method 900 may be carried out simultaneously with methods 2000 and 2100, shown in FIGS. 20 and 21, respectively, in some approaches. FIG. 10 shows another example of n=3 in the top chart, and the other example of n=1 in the bottom chart. As can be seen, the more iterations that are carried out (the greater the n), the better the performance is over time.

Figure 11:
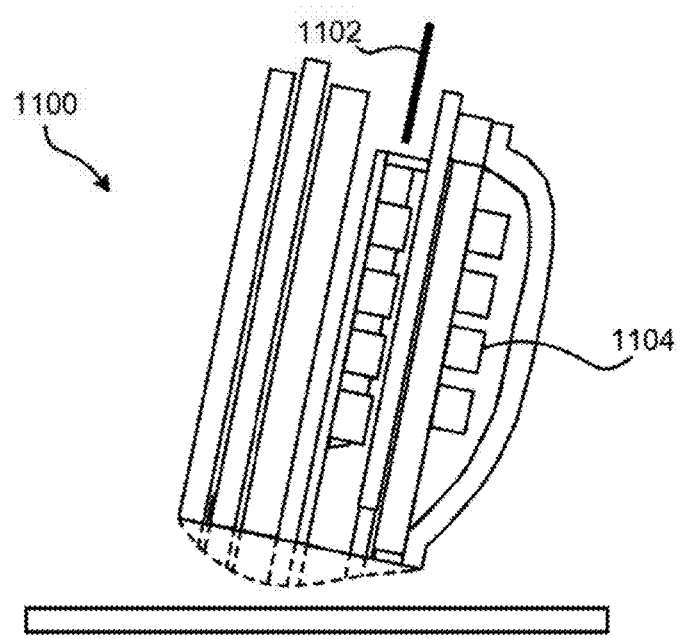
FIG. 11 shows an a cross-sectional view of a MAMR head, according to one embodiment.
Figure 12:
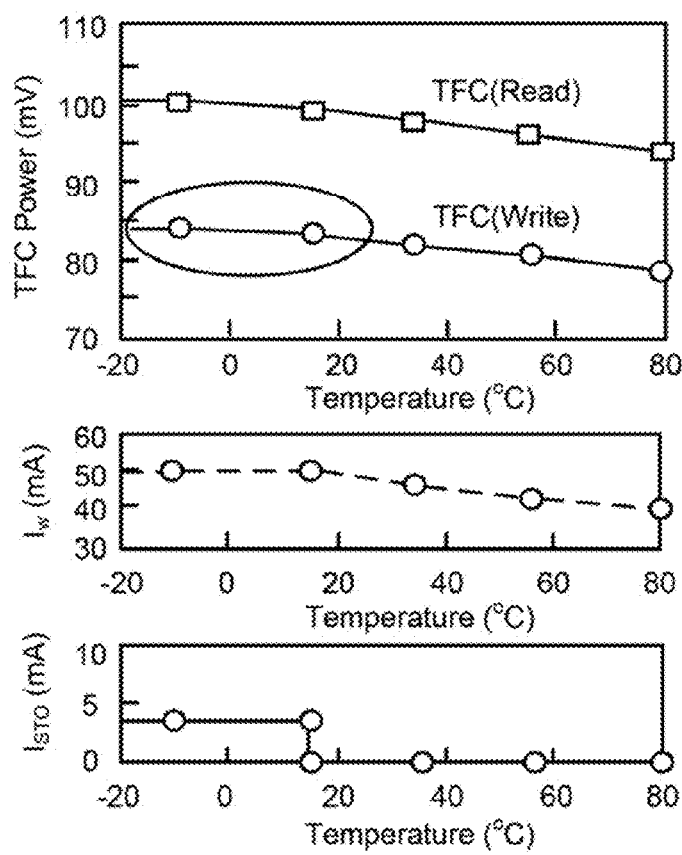
FIG. 12 shows an example of parameter setting for the MAMR head shown in FIG. 11, according to one embodiment.

FIG. 11 shows another example of a MAMR head 1100 according to one embodiment, and FIG. 12 shows its parameter adjustments of the write current, the STO current, and the TFC power at temperature regions characterized by carefully determined parameters −10° C., 15° C., 35° C., 55° C., and 80° C. In FIG. 11, the MAMR head 1100 is shown with a TFC element 1102 above the coils 1104 of the head 1100. As shown in FIG. 12, it should be noted that the STO current is turned off above 35° C. and constant (at about 3.6 mA) at temperatures lower than 35° C. It is clearly seen that writer protrusion is much better controlled at low temperatures below about 20° C. even with higher coercivity medium than the conventional PMR shown in FIG. 6. The optimization at cold temperatures can thus be done independently at high temperatures, allowing aggressive design of head and media parameters, allowing much higher track and bit densities in magnetic recording devices, such as those shown in FIG. 8, according to one embodiment. Actually, the achieved areal density is confirmed to be remarkably increased by 20% over conventional systems. Further, the failure rate is found to be remarkably reduced by about 50% in a stressed reliability test, especially improved for the clearance variation related test categories.

Referring again to FIGS. 1 and 11, according to one embodiment, a system comprises a magnetic medium and a magnetic head. For example, as shown in FIG. 1, a magnetic medium may be a magnetic disk 112. In other embodiments, the magnetic medium may be a magnetic tape, a magnetic card, or any other type of magnetic medium, and may be configured as a bit patterned medium (BPM), discrete track medium (DTM), etc., or any other type of magnetic medium as would be known to one of skill in the art.

Similarly, the magnetic head may be a MAMR head 1100, as shown in FIG. 11, according to one embodiment. Of course, the magnetic head may be any magnetic head suitable for writing data to the magnetic medium, as exemplified in one embodiment by the read/write head 121 as shown in FIG. 1, or any other type of magnetic head as would be understood by one of ordinary skill in the art.

In one embodiment, the magnetic head comprises a write element adapted for recording data on the magnetic medium. Any type of write element which is either adapted for or capable of being adapted for recording data on any type of magnetic media may be used as would be known to one of skill in the art. In addition, the magnetic head may comprise a TFC element for assisting the write element in recording data to the magnetic medium, as would be understood by one of skill in the art.

Furthermore, in more embodiments, the system may include a MAMR element, and in particular a MAMR element adapted for assisting recording on the magnetic medium. In some approaches, the MAMR element assists recording on the magnetic medium by employing a microwave-generating portion thereof. Moreover, in one approach, the microwave-generating portion of the MAMR element may receive current for operation. Current may be received in any manner and from any suitable source, such as AC power, DC power, electrical impulse, waveform, etc., as would be understood by one having ordinary skill in the art upon reading the present descriptions.

Additionally to the write element and/or the MAMR element, in one embodiment, the system may also include a read element adapted for reading data from the magnetic medium. Of course, any read element suitable for reading data from any magnetic medium may be used in the system, as would be understood by one having ordinary skill in the art.

In some embodiments, the system may include a first device adapted for measuring one or more environmental conditions relating to the MAMR element and the magnetic medium. In more embodiments, the system may include a controller adapted for controlling operation of the magnetic head and adjusting operating parameters of the system based on the measured environmental conditions provided by the first device.

In various approaches, environmental conditions may include magnetic head operating temperature, overwrite (O/W), soft error rate (SER), head-to-disk medium clearance, etc. In one embodiment, the environmental conditions measured by the first device comprise temperature. In various approaches, temperature may be measured in Kelvin, Centigrade, Fahrenheit, etc.

In one embodiment, the controller may include logic adapted for adjusting a clearance between the MAMR element and the magnetic medium, a read/write integrated circuit, and a signal processing channel integrated circuit. Of course, as would be understood by one having ordinary skill in the art upon reading the present descriptions, any suitable type of read/write integrated circuit and signal processing channel integrated circuit may be employed in systems as described herein.

"Clearance" in the context of the present description is understood to refer to clearance between the MAMR element and the magnetic medium, which in turn refers to a distance separating the MAMR element and the magnetic medium (such that they do not physically contact one another), in one embodiment. Clearance may be determined according to any suitable method, for example, by employing a contact sensor, a proximity sensor, and/or any other appropriate sensor as would be understood by one having ordinary skill in the art upon reading the present descriptions.

The environmental conditions relating to the MAMR element may include any environmental conditions that effect, are affected by, constitute, comprise, or are otherwise related to the MAMR element, operation of the MAMR element, etc., according to multiple approaches. Furthermore, the environmental conditions relating to the magnetic medium may include any environmental conditions that effect, are affected by, constitute, comprise, or are otherwise related to the magnetic medium, operation of the magnetic medium, etc., according to multiple approaches.

Any system, device, apparatus, logic, code, etc., may be used to measure the environmental conditions as would be appreciated by one of skill in the art upon reading the present descriptions, such as a thermocouple, thermometer, barometer, read channel, output signal, contact sensor, etc.

Figure 13:
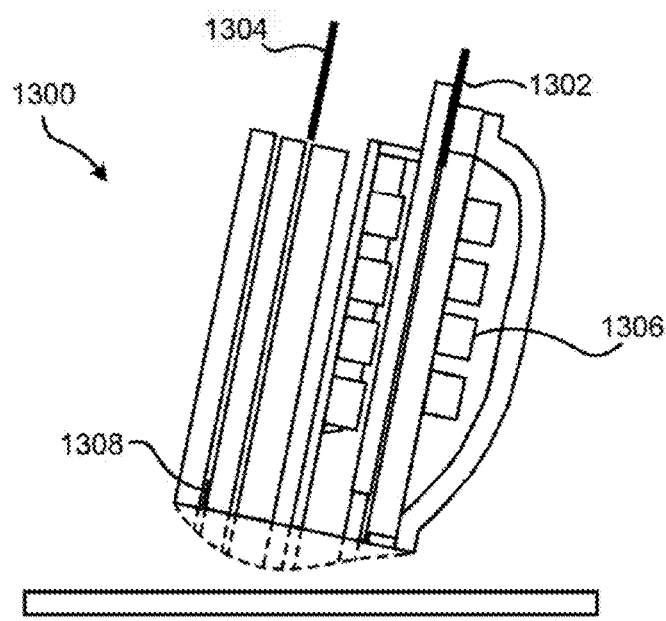
FIG. 13 shows an a cross-sectional view of a MAMR head, according to one embodiment.
Figure 14:
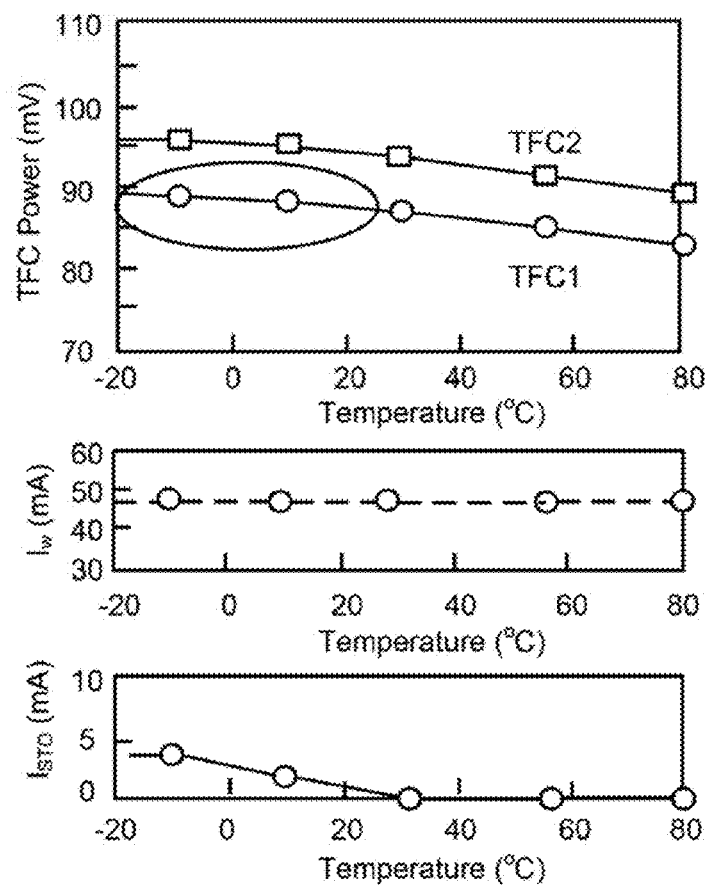
FIG. 14 shows an example of parameter setting for the MAMR head shown in FIG. 13, according to one embodiment.
Figure 15:
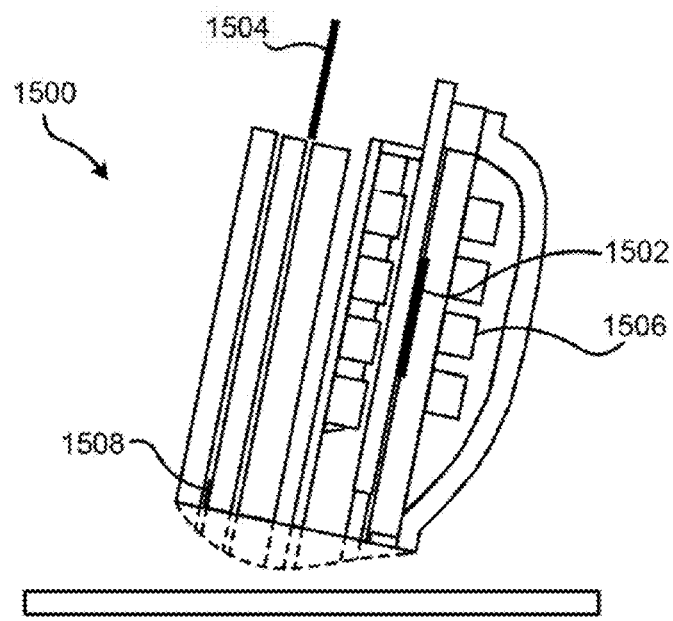
FIG. 15 shows an a cross-sectional view of a MAMR head, according to one embodiment.
Figure 16:
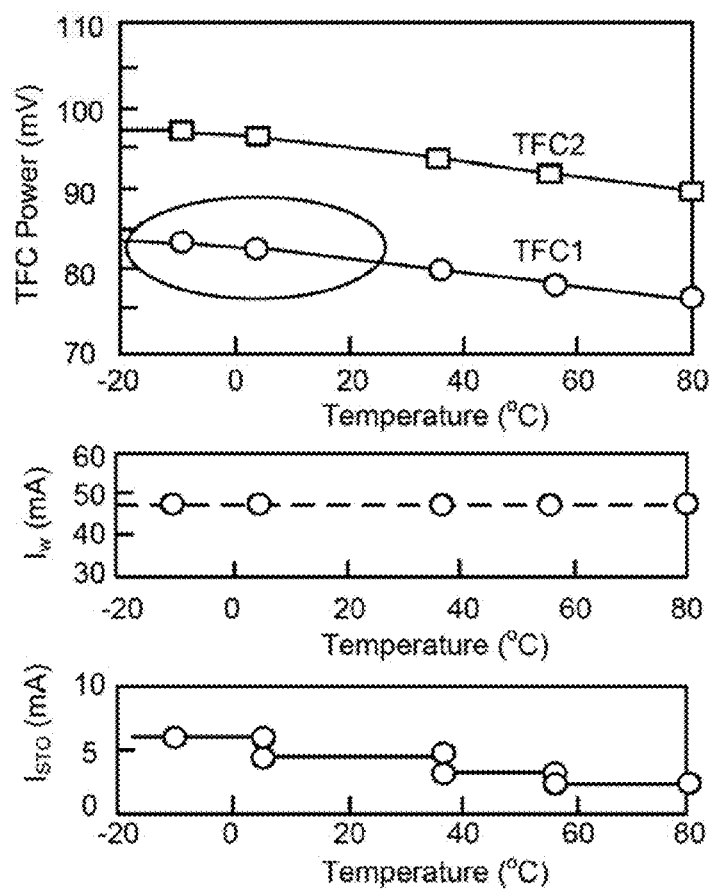
FIG. 16 shows an example of parameter setting for the MAMR head shown in FIG. 15, according to one embodiment.
Figure 17:
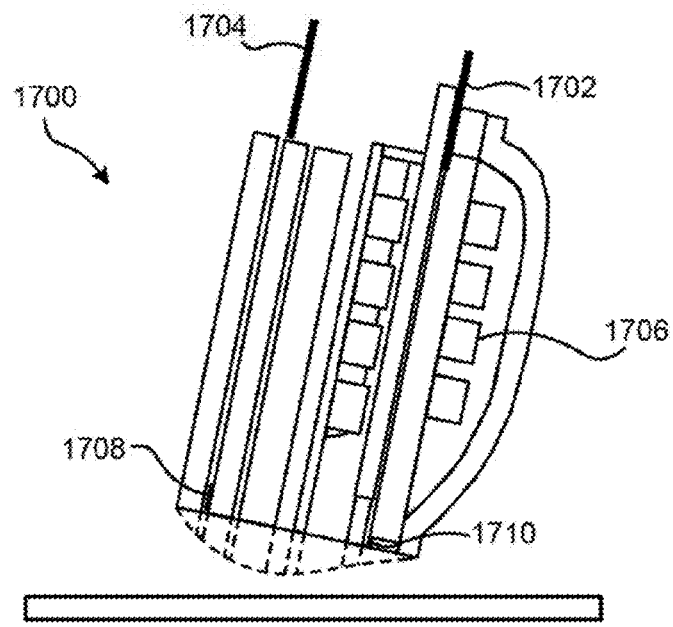
FIG. 17 shows an a cross-sectional view of a MAMR head, according to one embodiment.
Figure 18:
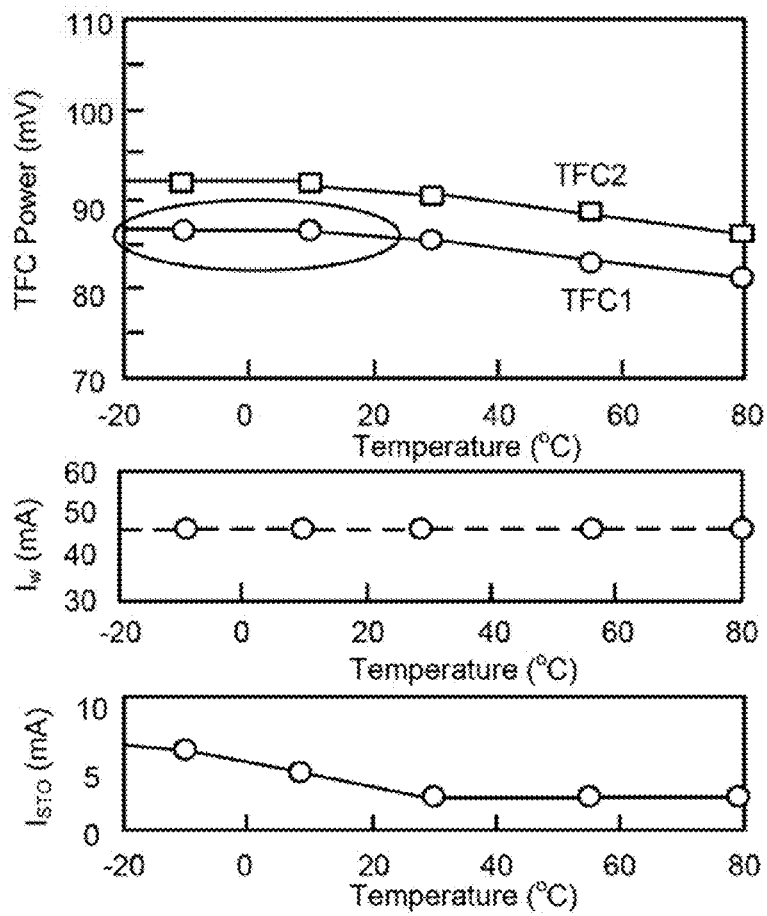
FIG. 18 shows an example of parameter setting for the MAMR head shown in FIG. 17, according to one embodiment.

In some embodiments, a controller, such as controller 129 shown in FIG. 1, may control several aspects of the systems described herein. For example, the controller, in one embodiment, may be adapted for controlling a position of a microwave-generating portion of the MAMR element. In such embodiments, the position may be controlled in order to adjust a clearance between the microwave-generating portion and the magnetic medium. For example, some embodiments may employ position control and clearance adjustment functionality according to the exemplary clearance adjusting systems as shown in FIGS. 13, 15 and 17, with corresponding parameter adjustments of operational parameters as shown in FIGS. 14, 16 and 18, respectively.

In other embodiments, the controller may be additionally and/or alternatively adapted for controlling current being injected into the microwave-generating portion oldie MAMR element. Current may be controlled in this manner according to any suitable approach known to those of skill in the art, such as by employing a feedforward loop, a feedback loop, progressive, integral, and/or derivative control or a combination thereof (PID), etc.

In one embodiment, the controller may increase current to the microwave-generating portion at lower operating temperatures as compared to current provided to the microwave-generating portion at higher operating temperatures. In one particular approach, the lower operating temperatures may include any temperature less than about 20° C.

In another embodiment, the first device may be adapted to measure a reproduced signal of the read element including overwrite performance of the system. Any metric may be used to measure the reproduced signal of the read element, including noise, error rate, signal-to-noise ratio (SNR), distortion, etc., as would be understood by one of skill in the art upon reading the present descriptions.

In one example, current may be controlled based on one or more environmental conditions, such as temperature, position of the microwave-generating portion, current provided to the microwave-generating portion, etc., as would be understood by one having ordinary skill in the art upon reading the present descriptions. Of course, the environmental conditions may include any environmental conditions that effect, are affected by, constitute, comprise, or are otherwise related to the MAMR element and/or magnetic medium, the operation of the MAMR element and/or magnetic medium, etc., according to multiple approaches.

In some embodiments, a system may include a first device and a second device, the first device being adapted for measuring environmental conditions relating to a microwave-assisted magnetic recording (MAMR) element of a magnetic head and a magnetic medium.

In a related approach, the second device may be adapted for adjusting operating parameters of the magnetic head based on the environmental conditions provided by the first device. Of course, these operating parameters may include any operating parameters of the magnetic head and/or MAMR element, including parameters such as an amount of current provided to a write element, a temperature of the magnetic head, data provided to the write element, a time in use, or any other parameter as would be apparent to one of skill in the art upon reading the present descriptions.

In another embodiment, the second device may further be adapted for controlling injected current to the microwave-generating portion based on the environmental conditions measured by the first device. For example, in one particular approach, the second device may increase current to the microwave-generating portion at lower operating temperatures as compared to current provided to the microwave-generating portion at higher operating temperatures. Of course, other approaches to controlling current injected into the microwave-generating portion may be utilized, as would be appreciated by one having ordinary skill in the art upon reading the present descriptions.

FIG. 13 shows another example of a MAMR head 1300 with a clearance adjusting system according to one embodiment, and FIG. 14 shows its parameter adjustments of the write current, the STO current, and the TFC power at temperature regions characterized by carefully determined parameters: −10° C., 10° C., 30° C., 55° C., and 80° C. In FIG. 13, the MAMR head 1300 is shown with two TFC elements, one TFC element 1302 above the coils 1306 of the head 1300 and the other TFC element 1304 above and between the coils 1306 and the read element 1308. As shown in FIG. 14, in the temperature range between −10° C. and 30° C., the STO current linearly increase from 0 to 4.5 mA as the temperature decreases. It is clearly seen that the writer protrusion is much better controlled at low temperatures below about 20° C. even with the medium having higher coercivity than the conventional PMR. Actually, the achieved areal density in this example is confirmed to increase by about 15% over conventional systems. Further, the failure rate is found to be remarkably reduced by about a third in a stressed reliability test, especially improved for the clearance variation related test categories.

FIG. 15 shows another example of a MAMR head 1500 with another clearance adjusting system according to one embodiment, and FIG. 16 shows its parameter adjustment results. In FIG. 15, the MAMR head 1500 is shown with two TFC elements, one TFC element 1502 between the coils 1506 of the head 1500, and a second TFC element 1504 above and between the coils 1506 and the read element 1508. As shown in FIG. 16, the range boundary temperatures are selected as −10° C., 5° C., 35° C., 55° C., and 80° C., and the STO current is adjusted to 6.0 mA, 4.7 mA, 3.0 mA, and 2.4 mA in each temperature range, respectively. The write current is almost constant at about 47 mA. It is clearly shown that writer protrusion is much better controlled at low temperatures below about 20° C. even with the medium having much higher coercivity than the conventional PMR. The achieved areal density is about twice as high and the failure rate in the stressed reliability test is about 50% lower than the conventional PMR.

FIG. 17 shows another example of a MAMR head 1700 with another clearance adjusting system according to one embodiment, and FIG. 18 shows its parameter adjustment results. In FIG. 17, the MAMR head 1700 is shown with two TFC elements, a first TFC element 1702 above the write pole 1710 and a second TFC element 1704 above the read element 1708. In this example, the STO current has a bias current of 2.4 mA to that of the example shown in FIG. 14. Referring again to FIGS. 17-18, the write current is almost constant at about 45 mA. It is clearly shown that writer protrusion is much better controlled at low temperatures below about 20° C. even with the medium having much higher coercivity than the conventional PMR. The achieved areal density is about 170% higher and the failure rate in the reliability test is about 40% lower than the conventional PMR.

Figure 19:
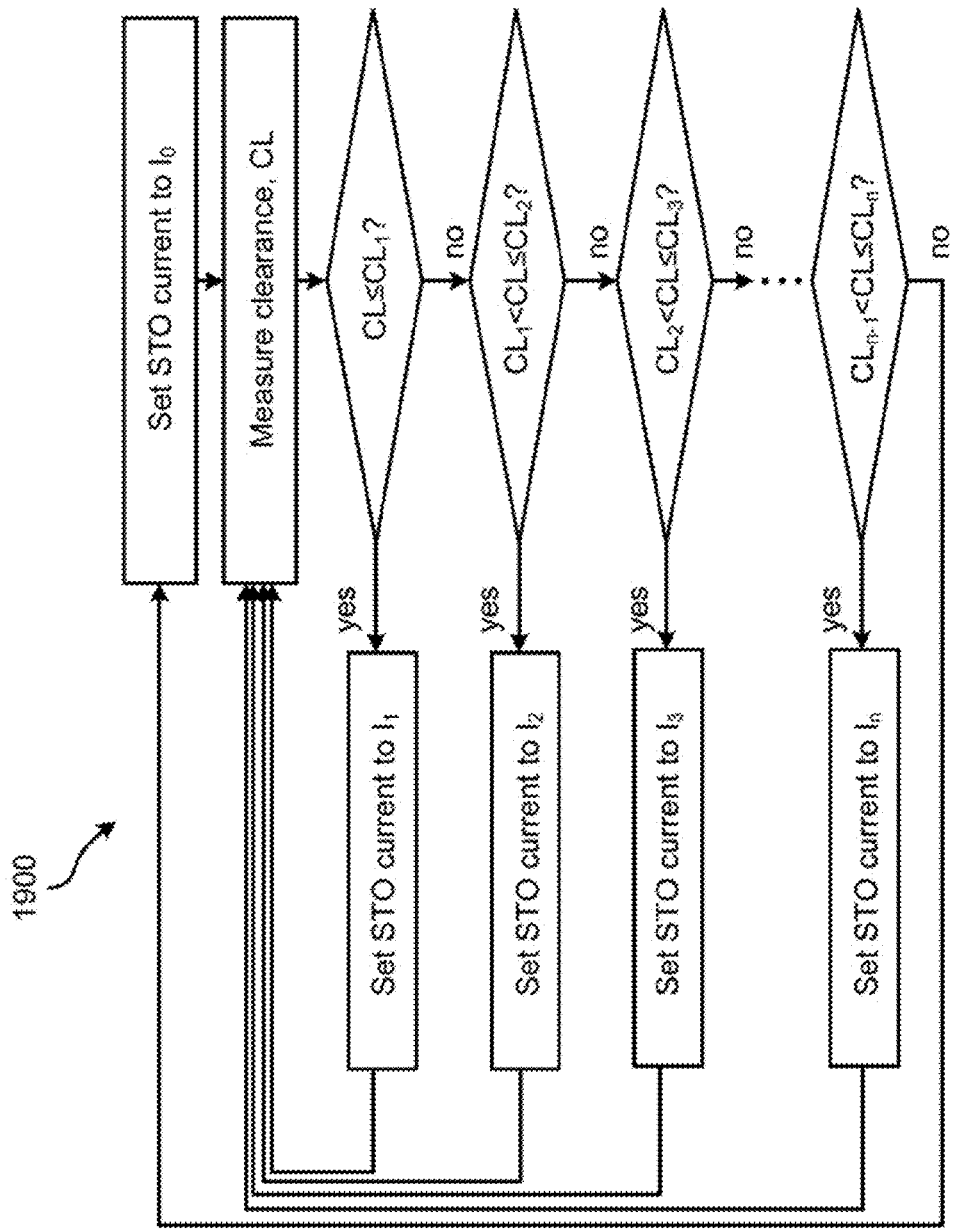
FIG. 19 shows an example of a flowchart for STO setting, according to one embodiment.

Referring to FIG. 19, a method 1900 is shown according to one embodiment. The method 1900 may be carried out in any desired environment, including those shown in FIGS. 1-18, among others. More or less operations may be carried out in accordance with method 1900 according to various embodiments.

Method 1900 shows an iterative current selection process, where the STO current is set to $I_0$ initially, and then the clearance CL between the MAMR element or a microwave-generating portion thereof and the magnetic medium surface is measured. This measured clearance CL is compared to a first clearance $CL_1$. If $CL \leq CL_1$, then STO current is set to $I_1$, and the clearance CL is measured again. If not, it is determined if $CL_1 < CL \leq CL_2$, and if so, STO current is set to $I_2$ and the clearance CL is measured again. Otherwise, it is determined if $CL_2 < CL \leq CL_3$, and if so, STO current is set to $I_3$ and the clearance CL is measured again. This process repeats for any number of currents $I_n$ and any number of clearances $CL_n$, as would be appreciated by one of skill in the art upon reading the present descriptions.

Figure 20:
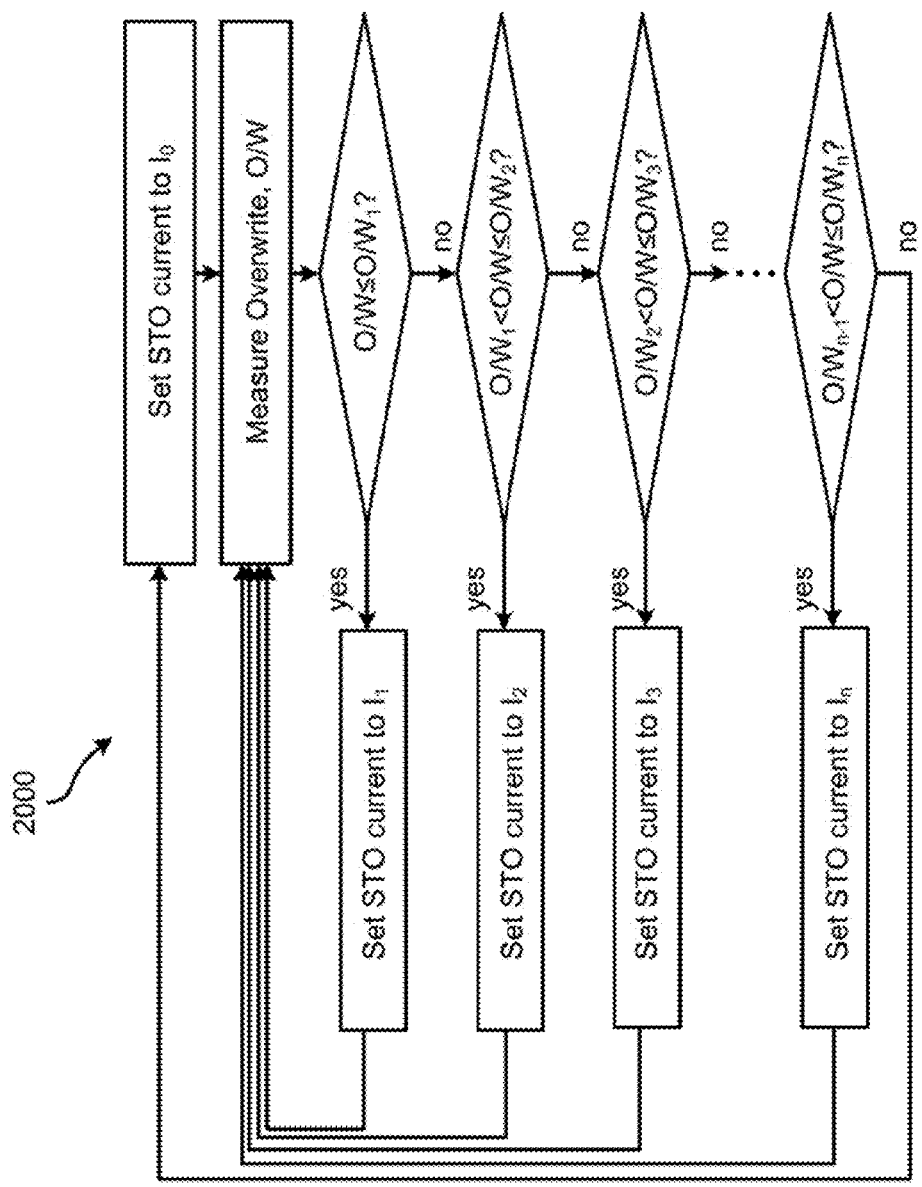
FIG. 20 shows an example of a flowchart for STO setting, according to one embodiment.

In addition, method 1900 may be carried out simultaneously with methods 900 and 2000 shown in FIGS. 9 and 20, respectively, in some approaches.

Referring to FIG. 20, a method 2000 is shown according to one embodiment. The method 2000 may be carried out in any desired environment, including those shown in FIGS. 1-18, among others. More or less operations may be carried out in accordance with method 2000 according to various embodiments.

Method 2000 shows an iterative current selection process, where the STO current is set to $I_0$ initially, and then the overwrite O/W of the readback write signal is measured. This measured overwrite O/W is compared to a first overwrite $O/W_1$. If $O/W \leq O/W_1$, then STO current is set to $I_1$, and the overwrite O/W is measured again. If not, it is determined if $O/W_1 < O/W \leq O/W_2$, and if so, STO current is set to $I_2$ and the overwrite O/W is measured again. Otherwise, it is determined if $O/W_2 < O/W \leq O/W_3$, and if so, STO current is set to $I_3$ and the overwrite O/W is measured again. This process repeats for any number of currents $I_n$ and any number of overwrites $O/W_n$, as would be appreciated by one of skill in the art upon reading the present descriptions.

In addition, method 2000 may be carried out simultaneously with methods 900 and 1900 shown in FIGS. 9 and 19, respectively, in some approaches.

Figure 21:
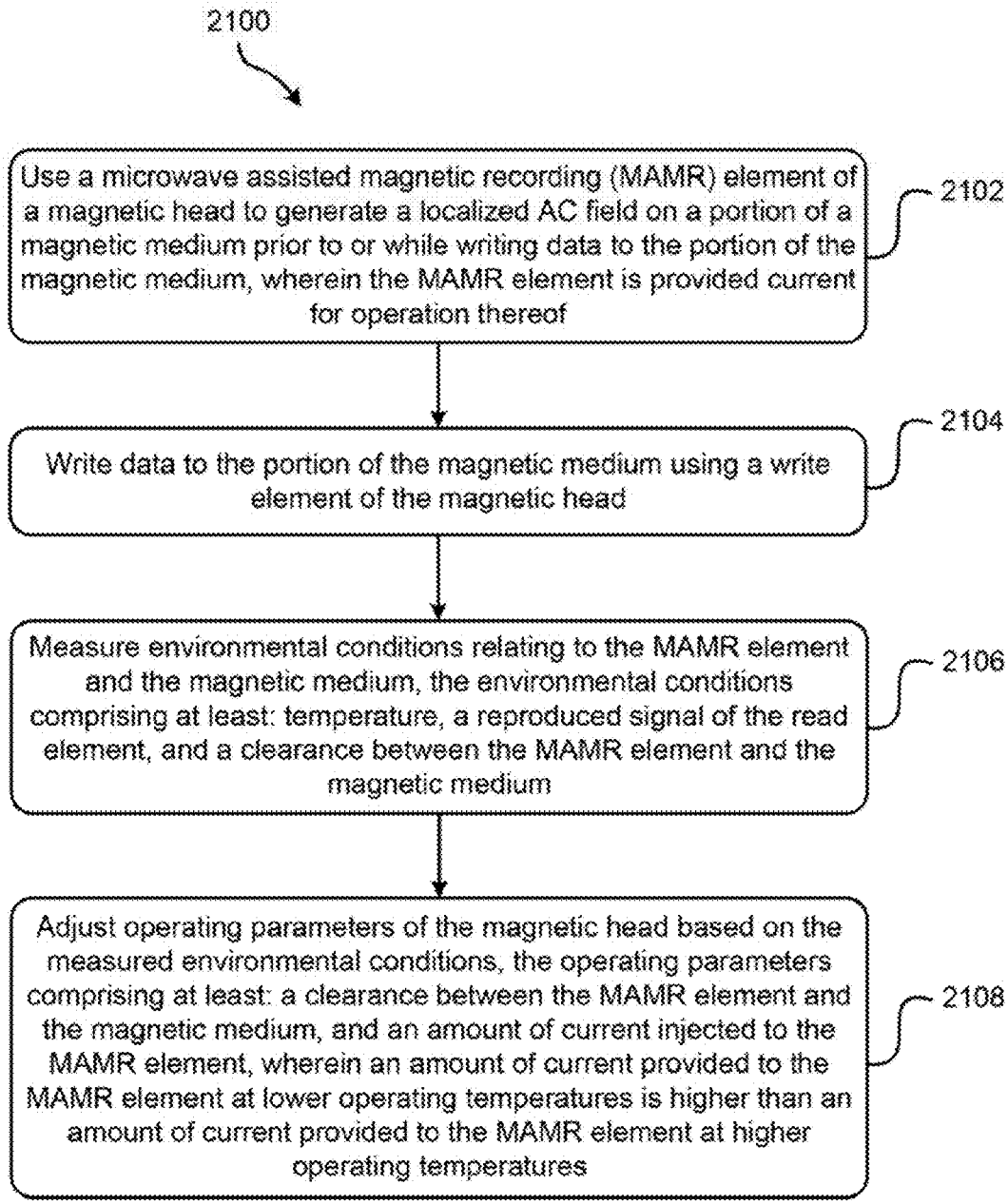
FIG. 21 shows a flowchart of a method, according to one embodiment.

Referring to FIG. 21, a method 2100 is shown according to one embodiment. The method 2100 may be carried out in any desired environment, including those shown in FIGS. 1-18, among others. More or less operations may be carried out in accordance with method 2100 according to various embodiments, as would be understood by one of skill in the art upon reading the present descriptions.

In operation 2102, a MAMR element of a magnetic head is used to generate a localized AC field on a portion of a magnetic medium prior to or while writing data to the portion of the magnetic medium. The MAMR element is provided current for operation thereof.

Any type of magnetic head as would be known to one of skill in the art may be used, such as a giant magnetoresistive (GMR) head, a tunneling magnetoresistive (TMR) head, etc., provided that it includes the MAMR element as described herein. In more approaches, a MAMR element may include any MAMR element as described herein according to any of various embodiments. The current provided to the MAMR element may be in the form of an electrical impulse, waveform, AC power, DC power, constant current, constant voltage, etc., as would be understood by one of skill in the art upon reading the present descriptions.

The localized AC field may be generated using a STO as described herein according to various embodiments. In other approaches, other types of MAMR elements may be used to generate a localized AC field, as would be understood to one of skill in the art upon reading the present descriptions.

The magnetic medium, according to various embodiments, may be a magnetic disk, a magnetic tape, etc., and may be configured as a bit patterned medium (BPM), discrete track medium (DTM), etc., or any other type of magnetic medium as would be known to one of skill in the art. When a portion of the magnetic medium is described, what is meant is that any portion or the whole of the magnetic medium may be affected. In one embodiment, the portion of the magnetic medium may be a portion that is being written to or is about to be written to.

As would be understood to one of skill in the art upon reading the present descriptions, any type or form of microwave-assisted writing may be used in conjunction with method 2100, according to various embodiments.

In operation 2104, data is written to the portion of the magnetic medium using a write element of the magnetic head. Any write element as described herein or known in the art may be used to write the data to the magnetic medium.

In operation 2106, environmental conditions relating to the MAMR element and the magnetic medium are measured, the environmental conditions comprising at least: temperature, a reproduced signal of the read element, and a clearance between the MAMR element and the magnetic medium, according to one embodiment. Of course, other and/or alternative environmental conditions of any type, kind, configuration, etc., may be measured as would be understood by one of skill in the art upon reading the present descriptions, according to various embodiments.

The environmental conditions relating to the MAMR element may include any environmental conditions that effect, are affected by, constitute, comprise, or are otherwise related to the MAMR element, operation of the MAMR element, etc., according to multiple approaches. Furthermore, the environmental conditions relating to the magnetic medium may include any environmental conditions that effect, are affected by, constitute, comprise, or are otherwise related to the magnetic medium, operation of the magnetic medium, etc., according to multiple approaches.

Any system, device, apparatus, logic, code, etc., may be used to measure the environmental conditions as would be appreciated by one of skill in the art upon reading the present descriptions, such as a thermocouple, thermometer, barometer, read channel, output signal, contact sensor, etc.

In operation 2108, operating parameters of the magnetic head are adjusted based on the measured environmental conditions, the operating parameters comprising at least: a clearance between the MAMR element and the magnetic medium, and an amount of current injected to the MAMR element, according to one embodiment. Of course, other and/or alternative operating parameters of any type, kind, configuration, etc., may be adjusted as would be understood by one of skill in the art upon reading the present descriptions, according to various embodiments.

According to one embodiment, an amount of current provided to the MAMR element at lower operating temperatures is higher than an amount of current provided to the MAMR element at higher operating temperatures, in some approaches. In one embodiment, the lower operating temperatures may be any temperature less than about 20° C., 30° C., 40° C., etc. The higher operating temperatures, according to one approach, may be any temperature greater than the lower operating temperatures or may be a temperature greater than about 20° C., 30° C., 40° C., etc., according to another embodiment.

The operating parameters of the magnetic head may additionally and/or alternatively include any operating parameter, such as current provided to a write element, temperature of the magnetic head, data provided to the write element, time in use, or any other parameter as would be apparent to one of skill in the art upon reading the present descriptions.

Adjustments to the operating parameters may be executed in step-wise fashion, gradually, etc., and may be initiated by any system and/or device, including the magnetic head, as would be appreciated by one of skill in the art upon reading the present descriptions.

Of course, any embodiments and/or approaches described herein may be included in method 2100, according to various embodiments, which are not described here for brevity.

Operation with a high current density of about $10^8$ A/cm$^2$ or more may be used for a MAMR element. Therefore, due to these high current densities used during operation, reliability of the MAMR element is difficult to ensure. According to the operating temperature environment, etc., the operating conditions for the MAMR element may be controlled to achieve reliability. In this way, without harming reliability of the MAMR element, improvements may be made and performance greatly enhanced for a magnetic head, including increases in the storage capacity of an apparatus, and improvement in the yield. A performance increase of about one order in magnitude is expected due to operating the MAMR element only during low operating temperatures with severe O/W specification.

Figure 22:
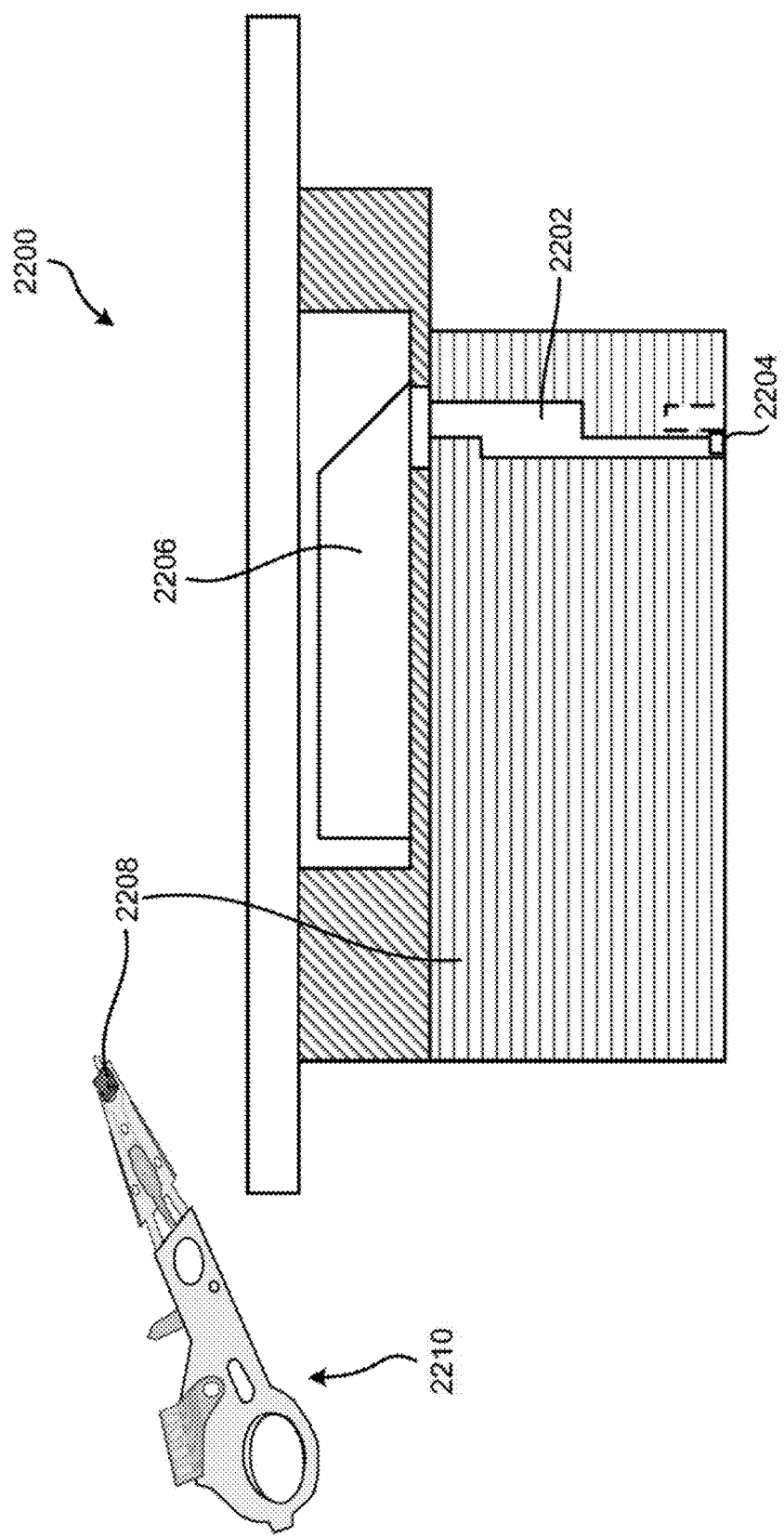
FIG. 22 shows a portion of a magnetic head having a TAMR element, according to one embodiment.

Now referring to FIG. 22, a portion of a magnetic head 2200 having a TAMR element is shown according to one embodiment. The magnetic head 2200 comprises a waveguide 2202 for providing light from a light source 2206, such as a surface emitting laser diode (SELD) in one approach, to a near field transducer or element 2204, which may comprise any suitable material, such as gold, platinum, etc., and may comprise any suitable shape, as would be understood by one of skill in the art. The near field transducer 2204, in some embodiments, may be referred to as a localized heat-generating portion of a TAMR element. The waveguide 2202 may comprise a core layer comprising a light conductive material, such as $Ta_2O_5$ or any other suitable material, and may comprise cladding material adjacent the waveguide 2202, the cladding materials comprising any suitable low-index material, such as $SiO_2$, $Al_2O_3$, etc. The magnetic head 2200 may be mounted to a head slider 2208, in one approach, which may be at a tip of a head gimbal assembly 2210, according to one embodiment.

In one embodiment, in order to enlarge the window of operation of the magnetic head 2200, so that magnetic recording and reading devices with not only large capacity but also high HDI related reliability may be provided, the TAMR as shown in FIG. 22 may be used in accordance to a prescribed operation.

In one illustrative embodiment, a prescribed operation may include first adjusting injected power to a light source, such as a laser diode (e.g., to improve write-ability, HDI related performance improvement, etc.), write current (e.g., to improve write-ability, protrusion control, etc.), and TFC power (e.g. to improve clearance control between the magnetic head and the medium, etc.) in accordance with the information provided by a system that measures environmental conditions surrounding the head and the medium. In various embodiments, environmental conditions may include temperature, O/W, SER, head-medium clearance, etc., or any other condition which would be apparent to one skilled in the art upon reading the present description.

The prescribed operation may also include reducing the light source power at higher temperatures, which in one approach may include turning off TAMR which may allow the TAMR to be utilized during cold temperature operations. In such an approach, the write-ability for the magnetic recording head and medium may be centered more around the harder to write area. Therefore, in one approach, TAMR may be turned off during higher temperatures allowing the higher temperature optimization for thermal stability while still being able to write at low temperatures without surplus write current. This enables a remarkable increase of the window of operation including remarkable medium lifetime improvement, allowing for magnetic recording and reading devices with not only large capacity but also high HDI-related reliability.

Figure 23:
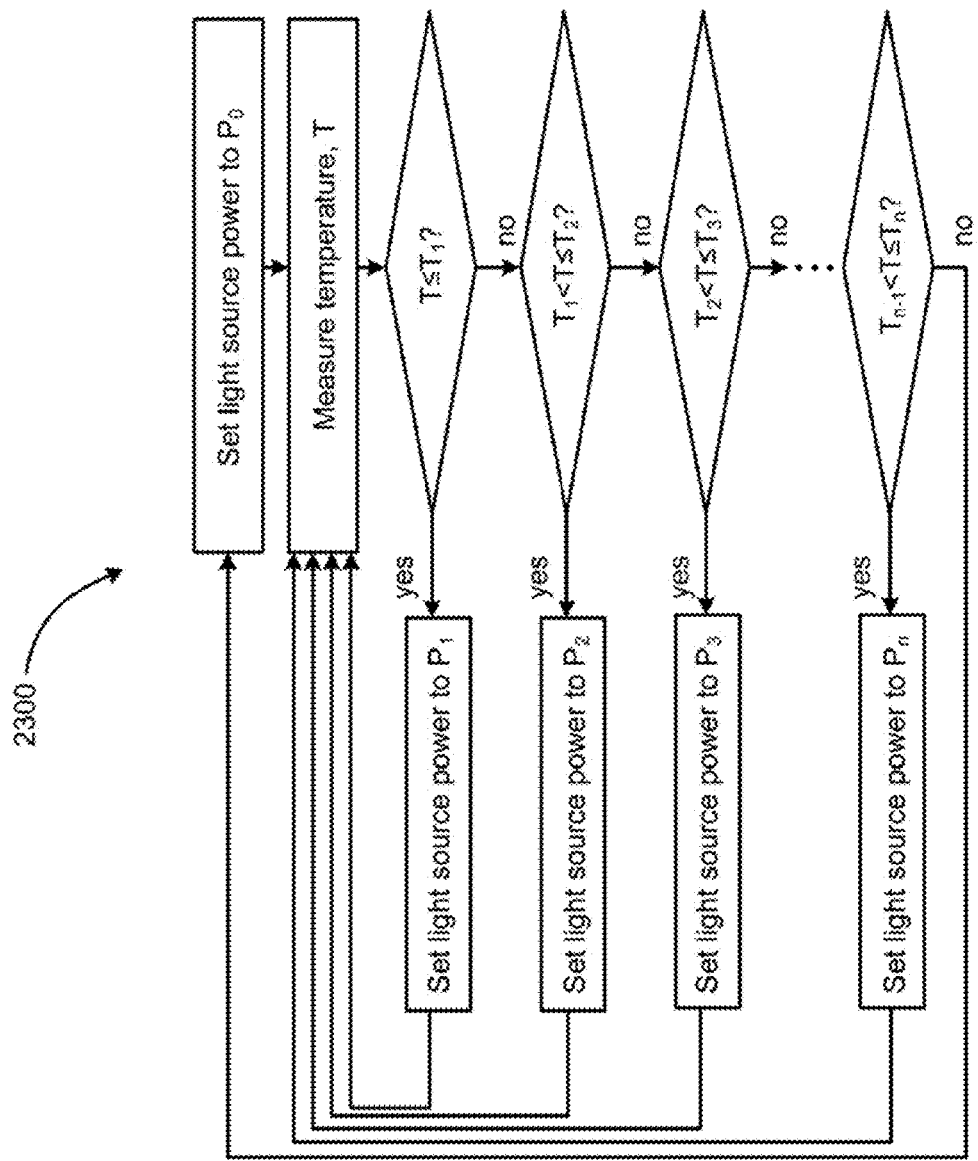
FIG. 23 shows a flow chart of a method that may be used to adjust parameters, according to one illustrative embodiment.

Now referring to FIG. 23, a flow chart of a method 2300 that may be used to adjust parameters is shown according to one illustrative embodiment. In the manufacturing process of a device, the servo signals may be written so that a tentative group of servo signals is written first. In one approach, the servo signals may be written by using the given write current, light source power, TFC power, etc., or any combination therein, preferably on a special medium region of a type which would be apparent to one skilled in the art. Furthermore, these parameters may be optimized using the evaluated data of read and write performances, which according to various approaches, may include signal output, overwrite (O/W), ATI, SER, etc., with the tentative servo signals. Finally, the end servo signals may be written on the full surfaces of the aforementioned medium using the optimized write current, light source power, and/or TFC power.

The write current, the light source power, and the TFC power may be optimized at temperature regions characterized by carefully selected parameters $T_1, T_2, \ldots, T_n$ corresponding to the embodiment depicted in FIG. 23 as follows. The read and write performances signal output, overwrite (O/W), ATI and SER, among others may be evaluated: on a special medium region in the above defined temperature regions in the manufacturing process. Here, total performance of the magnetic recording device, such as areal density, capacity, reliability, etc., may be optimized using a reliability estimation table, or the like, for the several sets of the write current, the light source power, and the TFC power. Moreover, the optimized light source power, $P_n$, in each temperature region, $T_{n-1} < T \le T_n$, is first determined for each n, where $P_0$ may be preferably extremely low light source power, such as 0 in some embodiments, and $T_0 = 0°$ C., etc. In one approach, the optimized write current and/or the optimized TFC power may also be determined in the same manner.

Furthermore, when the recording device is in use, the initial light source power may be set to $P_0$ whereupon the ambient temperature (T) around the head/medium is measured during a recording operation of the magnetic recording device. If T is smaller than or equal to $T_1$ ($T \le T_1$), the light source power is set to $P_1$. However, if this criteria is not satisfied and $T_1 < T \le T_2$, the light source power is set to $P_2$. If this criteria is again not satisfied, and $T_2 < T \le T_3$, the light source power is set to $P_3$, etc., to the point where, if all the previous criteria were not met, and $T_{n-1} < T \le T_n$, the light source power is set to $P_n$. In the situation where none of the aforementioned criteria are met, ($T > T_n$), the light source power is reset to $P_0$ and the process is repeated as depicted in FIG. 23. In a preferred approach, only after setting the optimized light source power for ambient temperature T does the recording start.

Figure 24:
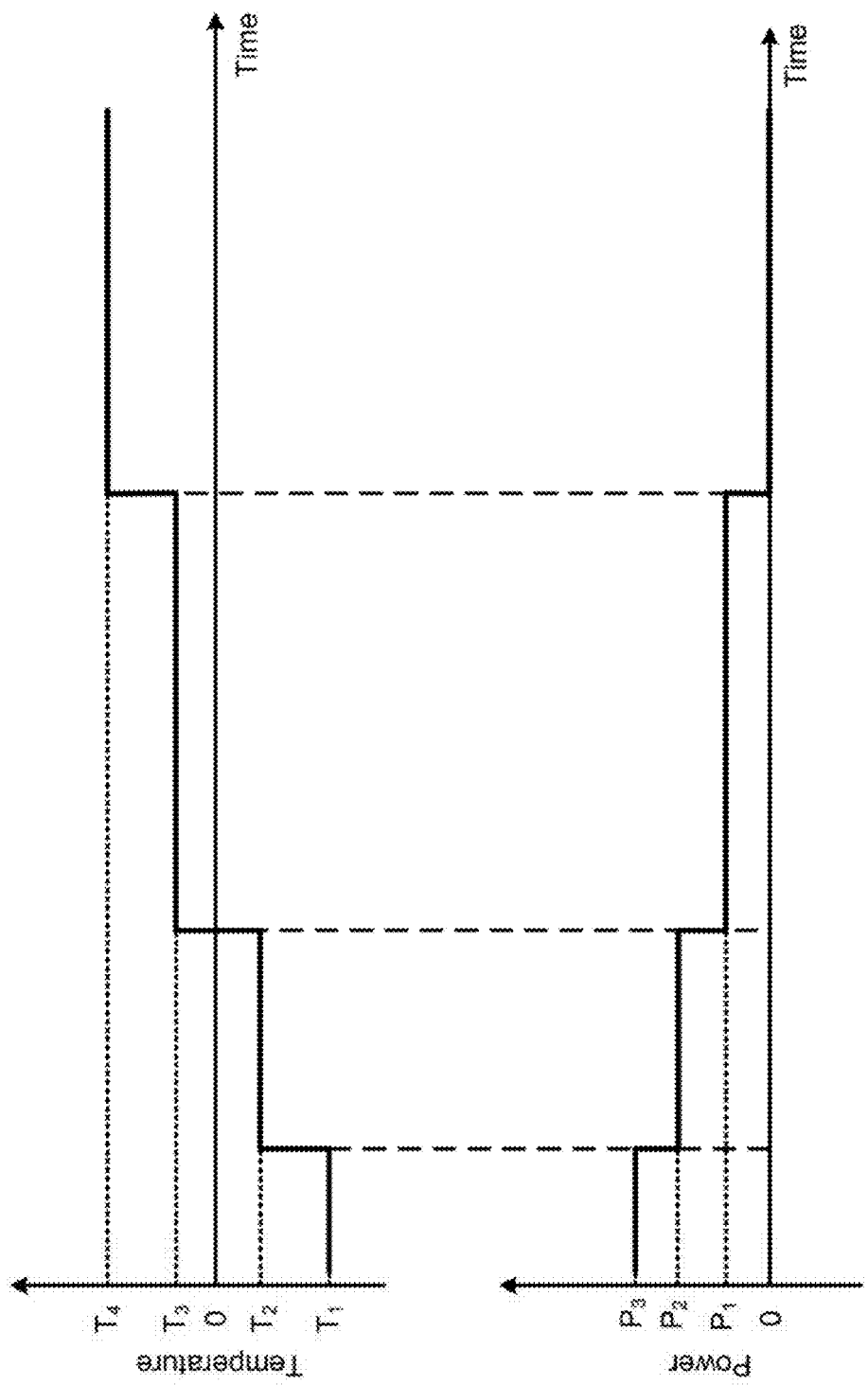
FIG. 24 depicts results of the method of FIG. 23, according to one embodiment, in which a number of iterations is three (n=3).
Figure 25:
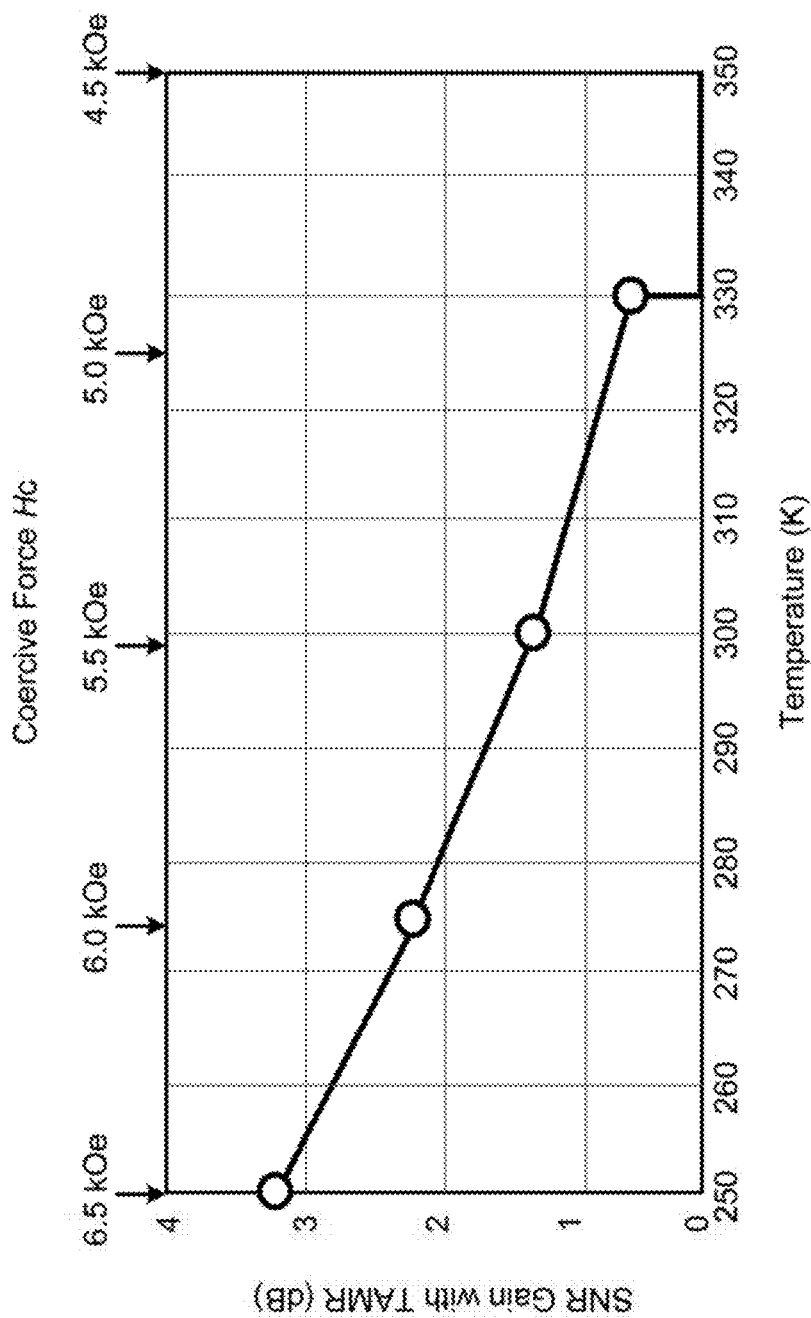
FIG. 25 shows a graph of coercivity (Hc) versus temperature, according to one embodiment.

FIG. 24 depicts results of the aforementioned method according to one embodiment in which a number of iterations is three, e.g., n=3. Resulting from the studies conducted on these results and results similar to these, it has been revealed that TAMR head embodiments similar to that depicted in FIG. 22, are remarkably effective in increasing the SNR. This is especially true for optimization of the operation window of magnetic recording and reading devices at low temperatures. The coercivity (Hc) of about 5.5 kOe at room temperature, increases by about 20 Oe/deg as the temperature reduces as depicted in the graph of FIG. 25, corresponding to a method in which the parameters may be adjusted corresponding to the scheme as depicted in FIG. 23.

Figure 26:
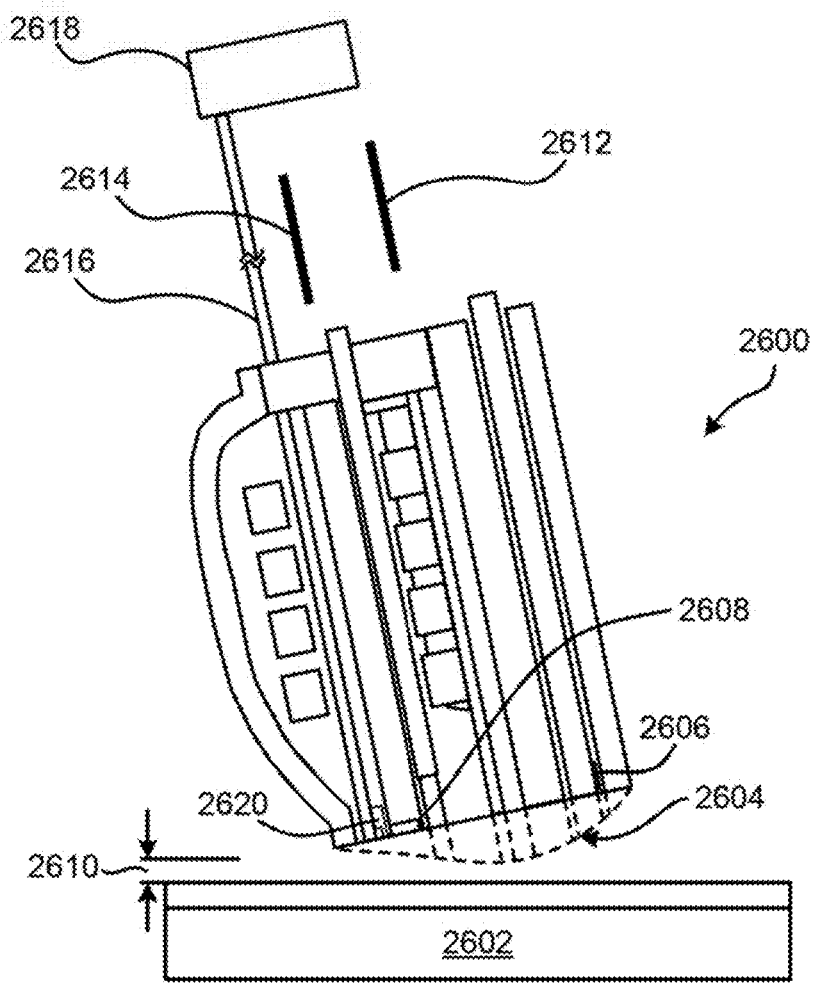
FIG. 26 shows a portion of a magnetic head having a TAMR element, according to one embodiment.

Now referring to FIG. 26, a portion of a magnetic head 2600 having a TAMR element as described herein is shown according to one embodiment. The magnetic head 2600 may be part of a system which includes a magnetic medium 2602 which may be passed across the magnetic head 2600 having a read element 2606 (as would be understood by one of skill in the art) and a write pole 2608. In another approach, the write pole 2608 may be, but is not limited to being, a write element adapted for writing data to the magnetic medium 2602. In various approaches, the magnetic medium 2602 may be a magnetic tape, a magnetic disk, etc., or any other magnetic medium which would be apparent to one skilled in the art upon reading the present description. In one approach, the read element 2606 may be a read element adapted for reading data from the magnetic medium 2602.

The magnetic head 2600 may also include a thermally-assisted magnetic recording (TAMR) device adapted for assisting recording on the magnetic medium 2602. In one approach, the TAMR element may include a localized heat-generating portion 2620, which may be a near field transducer, that receives light for operation thereof. In another approach, the localized heat-generating portion 2620 may incorporate two thermal fly-height control (TFC) elements 2612, 2614 which heat a portion of the magnetic head 2600 and cause a protrusion 2604 thus reducing the head-to-disk clearance 2610. In various approaches, the TFC elements 2612, 2614 may incorporate resistance heating, joule heating, etc., or any other form of thermal control which would be apparent to one skilled in the art upon reading the present description.

The magnetic head 2600 may additionally include one or more waveguides 2616 for providing light from a light source 2618 (e.g., a laser diode), to a near field transducer 2620. In one approach the near field transducer 2620 may include any suitable material, such as gold, platinum, etc., and may incorporate any suitable shape as would be understood by one skilled in the art upon reading the present description, such as a nano-beak, a C-shaped aperture, an E-shaped aperture, etc., as would be understood by one of skill in the art. In some embodiments, the near field transducer 2620 may be referred to as the localized heat-generating portion of a TAMR element. In other approaches, the waveguide 2616 may include a core layer incorporating a light conductive material, such as $Ta_2O_5$, or any other suitable material which would be apparent to one skilled in the art upon reading the present description. The TAMR element may comprise the waveguide 2616, the light source 2618, and the near field transducer 2620, in one approach.

In one illustrative embodiment, the magnetic head 2600 may incorporate a first device adapted for measuring environmental conditions (e.g., any of the aforementioned conditions or the like) relating to the TAMR element and the magnetic medium 2602. In one approach, the first device adapted for measuring environmental conditions may be a computer, logic device, integrated circuit (IC), etc., or any other device which would be apparent to one skilled in the art upon reading the present description. In another approach, the first device may be adapted to measure at least one of: a reproduced signal of the read element 2606 including overwrite (O/W) performance of the system, and a clearance between the localized heat-generating portion (e.g., the near field transducer 2620), the write element 2608, and/or one or more of the protrusion 2604 and the magnetic medium 2602.

The system may further incorporate a controller adapted for controlling operation of the magnetic head 2600 and adjusting operating parameters of the system based on the environmental conditions provided by the first device. In one embodiment, the controller may include logic adapted for adjusting clearance between the localized heat-generating portion 2620 and the magnetic medium 2602 by providing current to at least one TFC element 2612, 2614. In various approaches, current may be applied through direct current or alternating current to the TFC element 2612, 2614 or to an intermediate device that supplies the current to the TFC element 2612, 2614. Of course, the TFC elements may be located at positions other than those shown for TFC elements 2612, 2614 as would be understood by one of skill in the art.

In another approach, the controller may be adapted to control a write current, a current provided to the TAMR element, and a current provided to the TFC element at least simultaneously based on the environmental conditions measured by the first device. In one approach, the controller may be adapted for controlling current provided to the localized heat-generating portion and/or the TFC element based on the environmental conditions.

In still another approach, the controller may increase current to the localized heat-generating portion and/or the TFC element at lower operating temperatures of less than about 20° C. (but may higher or lower based on the desired embodiment) as compared to current provided to the heat-generating portion and/or the TFC element at higher operating temperatures. In an alternate approach, the current may not be provided to the localized heat-generating portion at operating temperatures of greater than about 30° C., but could be higher or lower based on the desired embodiment.

In another embodiment, the controller may additionally and/or alternatively include a read/write IC for supporting data writing and data reading. In still another embodiment, the controller may additionally and/or alternatively incorporate a signal processing channel IC.

Figure 27A:
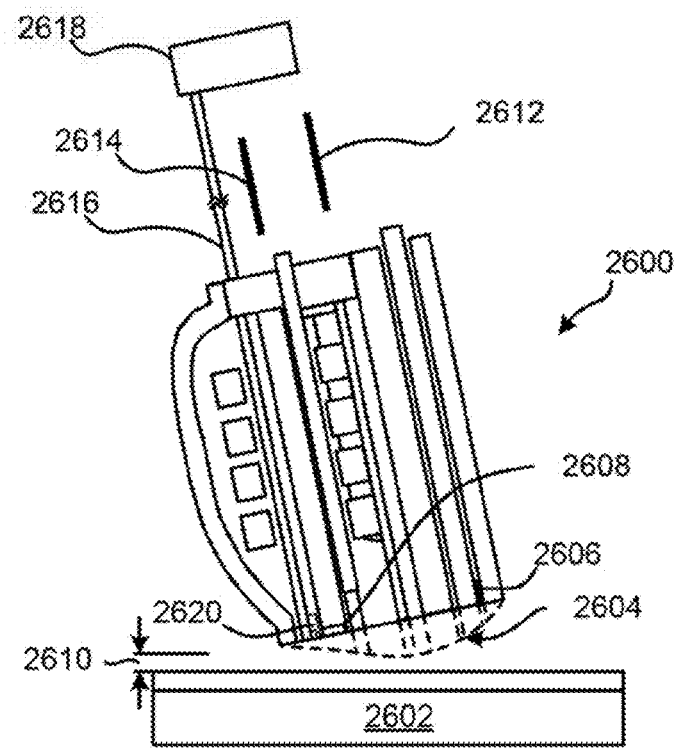
FIG. 27A shows a portion of a magnetic head having a TAMR element, according to one embodiment.
Figure 27B:
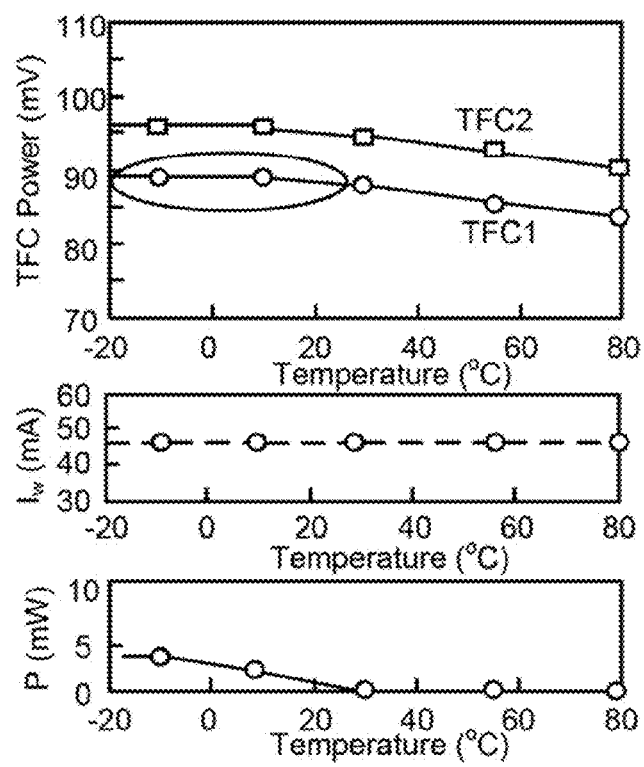
FIG. 27B shows a graph that depicts results of parameter adjustments corresponding to the magnetic head shown in FIG. 27A, according to one embodiment.

Referring to FIG. 27B, a graph is shown that depicts results of parameter adjustments corresponding to the embodiment of the magnetic head shown in FIG. 27A for the write current, light source power, and TFC power at temperature regions characterized by carefully determined parameters: −10° C., 10° C., and 30° C. The reference numbers shown in FIG. 27A are the same as those described in FIG. 26.

Corresponding to the graph shown in FIG. 27B, it should be noted that the light source power, which was a laser diode, is turned off above 30° C., resulting in a constant power reading of 0 mW. It should also be noted that the power readings increase linearly to 4 mW as temperature reduces from 30° C. to −10° C., and remains a constant 4 mW below −10° C.

As a result from the information displayed in FIG. 27B, it is clear that writer protrusion is much better controlled at low temperatures (below about 20° C.), even with a higher coercivity medium of about 6.0 kOe, than has been conventionally achieved. The optimization at cold temperatures may thus be done independently at high temperatures, allowing aggressive design of head and medium parameters, allowing much higher track and bit densities in magnetic recording devices. Actually, the achieved areal density is confirmed to be remarkably increased by 15%, while the failure rate is found to be remarkably reduced by about 30% in a stressed reliability test, which is exceptionally improved for the clearance variation related test categories.

Figure 28A:
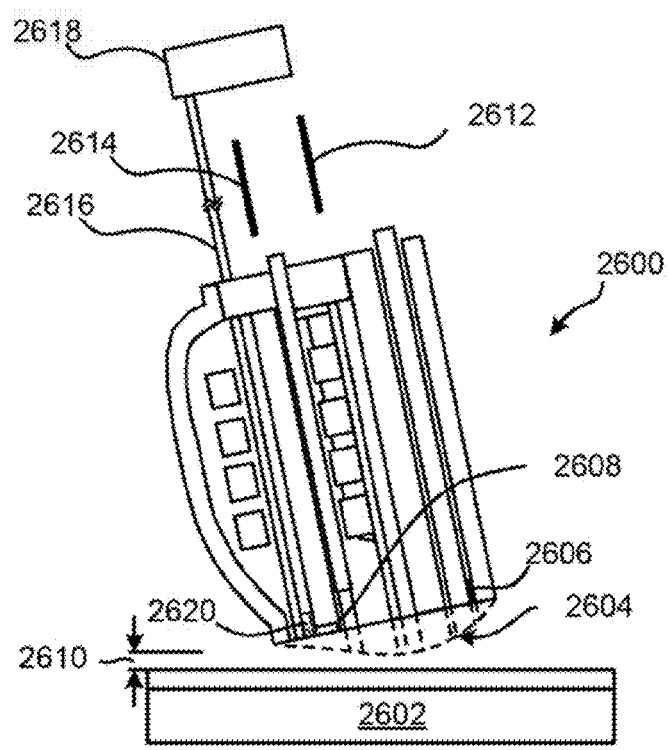
FIG. 28A shows a portion of a magnetic head having a TAMR element, according to one embodiment.
Figure 28B:
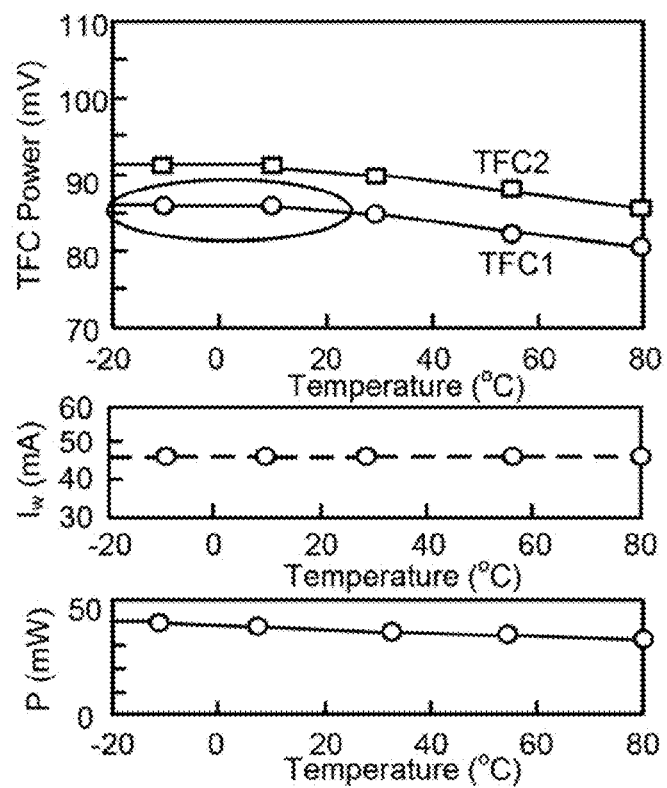
FIG. 28B shows a graph that depicts results of parameter adjustments corresponding to the magnetic head shown in FIG. 28A, according to one embodiment.

Referring now to FIG. 28B, a graph depicts the results of parameter adjustments corresponding to an illustrative embodiment of a TAMR head with a clearance adjusting system as described herein according to one embodiment, as shown in FIG. 28A for the write current, the light source power (which is a laser diode in this case), and the TFC power at temperature regions characterized by carefully determined parameters −10° C., 10° C., 35° C., 55° C., and 80° C. The reference numbers shown in FIG. 28A are the same as those described in FIG. 26.

Corresponding to the graph shown in FIG. 28B, it should be noted that the laser power linearly increases from 40 mW to 50 mW as the temperature decreases. As a result, it is clear that the writer protrusion is much better controlled at low temperatures (below about 20° C.), even with a medium having a higher coercivity of about 7.5 kOe at room temperature, than has been conventionally achieved. Actually, the achieved areal density in this example is confirmed to increase by about 30%, while the failure rate is found to be remarkably reduced by about a half in a stressed reliability test; exceptionally improved for the clearance variation related test categories.

Very similar effects were confirmed even using TAMR heads without a near field element; therefore the intensive study clearly revealed that the extremely large capacity of magnetic recording and reading devices with extremely high reliability are achievable with the various embodiments disclosed herein.

Without wishing to be bound by any theory, it is believed that operation with the high laser power is required for a thermally assisted magnetic recording on the medium with high Curie temperature. This then causes degradation of HDI related reliability and R/W performance of magnetic recording device due to the lubricant and carbon overcoat degradation and followed by head and medium wear and R/W performance degradation. Therefore, reservation of reliability is an important subject.

The temperature environment controls the situation of a localized heated-up area of medium and head-to-medium clearance by the various embodiments described herein. In this way, without spoiling the reliability of an element, it may improve performance greatly and may provide enlargement of the storage capacity of an apparatus, and improvement in the apparatus manufacturing yield.

A performance increase of about one order is expected also only by operating a TAMR element only on condition of low temperature with severe O/W specification. Therefore, it is thought that it may carry out the precedence application of the thermally assisted magnetic record technology, without spoiling reliability.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
   a magnetic medium;
   a magnetic head comprising:
      a write element configured to record data on the magnetic medium;
      a microwave-assisted magnetic recording (MAMR) element configured to assist recording on the magnetic medium, the MAMR element comprising a microwave-generating portion that is configured to generate a localized AC field on a portion of the magnetic medium prior to and/or while writing data to the portion of the magnetic medium using the write element, the microwave-generating portion being configured to receive current for operation thereof; and
      a read element configured to read data from the magnetic medium;
   a first device configured to measure environmental conditions relating to the MAMR element and the magnetic medium, the environmental conditions comprising at least: temperature, a reproduced signal of the read element, and a clearance between the MAMR element and the magnetic medium; and
   a controller configured to:
      control operation of the magnetic head and adjust operating parameters of the system based on the environmental conditions provided by the first device, the operating parameters comprising at least: a clearance between the MAMR element and the magnetic medium, a write current, and an amount of current injected to the MAMR element; and
      increase an amount of current provided to the MAMR element at lower operating temperatures as compared to an amount of current provided to the MAMR element at higher operating temperatures.

2. The system as recited in claim 1, wherein the controller comprises:
   a read/write integrated circuit; and
   a signal processing channel integrated circuit.

3. The system as recited in claim 1, wherein the controller is configured to adjust injected current density to a spin torque oscillator (STO) of the MAMR element to account for writeability and MAMR life time improvement based on the environmental conditions provided by the first device.

4. The system as recited in claim 1, further comprising a thermal fly-height control (TFC) element, wherein the controller is configured to control the clearance between the MAMR element and the magnetic medium by providing current to the TFC element.

5. The system as recited in claim 1, wherein the lower operating temperatures are any temperature less than about 20° C.

6. The system as recited in claim 1, wherein the first device is configured to measure the reproduced signal of the read element including overwrite performance of the system.

7. The system as recited in claim 1, wherein the first device is configured to measure all of: the temperature, the reproduced signal of the read element including overwrite performance of the system, and the clearance between the magnetic head and the magnetic medium.

8. A system, comprising:
   a first device configured to measure environmental conditions relating to a microwave-assisted magnetic recording (MAMR) element of a magnetic head and a magnetic medium,
   wherein the MAMR is configured to assist recording using a write element of the magnetic head on the magnetic medium,
   wherein the environmental conditions comprise at least: temperature, a reproduced signal of a read element of the magnetic head, and a clearance between the MAMR element and the magnetic medium, and
   wherein the MAMR element comprises a microwave-generating portion that is configured to receive current for operation thereof; and
   a second device configured to control operation of the magnetic head and adjust operating parameters of the magnetic head based on the environmental conditions provided by the first device, the second device comprising:
      logic configured to adjust clearance between the microwave-generating portion and the magnetic medium by providing current to a thermal fly-height control (TFC) element;
      logic configured to control a write current, a current provided to the MAMR element, and a current provided to the TFC element at least simultaneously based on the environmental conditions measured by the first device;
      a read/write integrated circuit for supporting data writing and data reading; and
      a signal processing channel integrated circuit.

9. The system as recited in claim 8, further comprising the TFC element.

10. The system as recited in claim 8, wherein the second device increases current to the microwave-generating portion at lower operating temperatures as compared to current provided to the microwave-generating portion at higher operating temperatures.

11. The system as recited in claim 8, wherein the lower operating temperatures are any temperature less than about 20° C.

12. The system as recited in claim 8, wherein the first device is adapted to measure the reproduced signal of the read element including overwrite performance of the system.

13. A magnetic data storage system, comprising:
   at least one magnetic head;
   a magnetic medium;
   a drive mechanism for passing the magnetic medium over the at least one magnetic head; and
   the system as recited in claim 8 electrically coupled to the at least one magnetic head for controlling operation of the at least one magnetic head.

14. A method, comprising:
   using a microwave-assisted magnetic recording (MAMR) element of a magnetic head to generate a localized AC field on a portion of a magnetic medium prior to and/or while writing data to the portion of the magnetic medium, wherein the MAMR element is provided current for operation thereof;

writing data to the portion of the magnetic medium using a write element of the magnetic head;

measuring environmental conditions relating to the MAMR element and the magnetic medium, the environmental conditions comprising at least: temperature, a reproduced signal of the read element, and a clearance between the MAMR element and the magnetic medium; and adjusting operating parameters of the magnetic head based on the measured environmental conditions, the operating parameters comprising at least: a clearance between the MAMR element and the magnetic medium, a write current, and an amount of current injected to the MAMR element, wherein an amount of current provided to the MAMR element at lower operating temperatures is higher than an amount of current provided to the MAMR element at higher operating temperatures.

15. A system, comprising:
a magnetic medium;
a magnetic head comprising:
    a write element configured to write data to the magnetic medium;
    a thermally-assisted magnetic recording (TAMR) device configured to assist recording on the magnetic medium, the TAMR element comprising a localized heat-generating portion that is configured to receive current for operation thereof; and
    a read element adapted for reading data from the magnetic medium;
a first device configured to measure environmental conditions relating to the TAMR element and the magnetic medium; and
a controller configured to control operation of the magnetic head and adjusting operating parameters of the system based on the environmental conditions provided by the first device, the controller comprising:
    logic configured to adjust clearance between the localized heat-generating portion and the magnetic medium by providing current to a thermal fly-height control (TFC) element;
    logic configured to control a write current, a current provided to the TAMR element, and a current provided to the TFC element at least simultaneously based on the environmental conditions measured by the first device;
    a read/write integrated circuit for supporting data writing and data reading; and
    a signal processing channel integrated circuit.

16. The system as recited in claim 15, wherein the controller increases current to the localized heat-generating portion and/or the TFC element at lower operating temperatures of less than about 20° C. as compared to current provided to the heat-generating portion and/or the TFC element at higher operating temperatures.

17. The system as recited in claim 16, wherein the controller comprises logic configured to not provide current to the localized heat-generating portion at operating temperatures of greater than about 30° C.

18. The system as recited in claim 15, wherein the first device is adapted to measure at least one of: a reproduced signal of the read element including overwrite performance of the system, a clearance between the localized heat-generating portion and the magnetic medium, and a clearance between the TFC element and the magnetic medium.

19. The system as recited in claim 18, wherein the first device is adapted to measure all of: the reproduced signal of the read element including overwrite performance of the system, the clearance between the localized heat-generating portion and the magnetic medium, and the clearance between the TFC element and the magnetic medium.

* * * * *

UNITED STATES PATENT AND TRADEMARK OFFICE
CERTIFICATE OF CORRECTION

| | | |
|---|---|---|
| PATENT NO. | : 8,760,779 B2 | Page 1 of 1 |
| APPLICATION NO. | : 13/341098 | |
| DATED | : June 24, 2014 | |
| INVENTOR(S) | : Johns et al. | |

It is certified that error appears in the above-identified patent and that said Letters Patent is hereby corrected as shown below:

In the specification:

col. 1, line 54 replace "(TAM)" with --(TAMR)--;

col. 12, line 41 replace "oldie" with --of the--;

col. 18, line 27 replace "(He)" with --(Hc)--.

Signed and Sealed this
Ninth Day of September, 2014

Michelle K. Lee
*Deputy Director of the United States Patent and Trademark Office*